United States Patent
Iwase et al.

(10) Patent No.: US 12,062,360 B2
(45) Date of Patent: Aug. 13, 2024

(54) INFORMATION PROCESSING DEVICE AND INFORMATION PROCESSING METHOD

(71) Applicant: SONY CORPORATION, Tokyo (JP)

(72) Inventors: Hiro Iwase, Tokyo (JP); Yuhei Taki, Tokyo (JP); Kunihito Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 101 days.

(21) Appl. No.: 16/972,420

(22) PCT Filed: Mar. 12, 2019

(86) PCT No.: PCT/JP2019/009840
§ 371 (c)(1),
(2) Date: Dec. 4, 2020

(87) PCT Pub. No.: WO2019/239656
PCT Pub. Date: Dec. 19, 2019

(65) Prior Publication Data
US 2021/0225363 A1 Jul. 22, 2021

(30) Foreign Application Priority Data
Jun. 12, 2018 (JP) ................. 2018-111946

(51) Int. Cl.
*G10L 15/065* (2013.01)
*G10L 15/08* (2006.01)
(Continued)

(52) U.S. Cl.
CPC ........ *G10L 15/065* (2013.01); *G10L 15/1815* (2013.01); *G10L 15/22* (2013.01); *G10L 15/28* (2013.01); *G10L 2015/088* (2013.01)

(58) Field of Classification Search
CPC ....... G10L 15/065; G10L 15/22; G10L 15/28; G10L 15/30
See application file for complete search history.

(56) References Cited

U.S. PATENT DOCUMENTS 8,938,394 B1*  1/2015  Faaborg ................. G10L 15/22
                                                    704/274
9,082,407 B1*  7/2015  Faaborg ................. G10L 25/48
(Continued)

FOREIGN PATENT DOCUMENTS

CN    1385788 A    12/2002
CN    1819016 A     8/2006
(Continued)

OTHER PUBLICATIONS

International Search Report and Written Opinion of PCT Application No. PCT/JP2019/009840, issued on Jun. 4, 2019, 10 pages of ISRWO.

*Primary Examiner* — Paras D Shah
(74) *Attorney, Agent, or Firm* — CHIP LAW GROUP

(57) ABSTRACT

The present invention has an issue of effectively reducing the input load related to a voice trigger. There is provided an information processing device comprising a registration control unit that dynamically controls registration of startup phrases used as start triggers of a voice interaction session, in which the registration control unit temporarily additionally registers at least one of the startup phrases based on input voice. There is also provided an information processing method comprising dynamically controlling, by a processor, registration of startup phrases used as start triggers of a voice interaction session, in which the controlling further includes temporarily additionally registering at least one of the startup phrases based on input voice.

17 Claims, 17 Drawing Sheets

(51) Int. Cl.
    *G10L 15/18*     (2013.01)
    *G10L 15/22*     (2006.01)
    *G10L 15/28*     (2013.01)

(56) References Cited

U.S. PATENT DOCUMENTS

| | | | |
|---|---|---|---|
| 2002/0174432 A1 | 11/2002 | Schiller | |
| 2009/0287681 A1* | 11/2009 | Paek | G06F 16/3322 |
| | | | 707/999.005 |
| 2015/0302855 A1* | 10/2015 | Kim | G10L 15/22 |
| | | | 704/275 |
| 2018/0137861 A1 | 5/2018 | Ogawa | |
| 2018/0197545 A1* | 7/2018 | Willett | G10L 15/1815 |
| 2018/0293221 A1* | 10/2018 | Finkelstein | G06N 20/00 |
| 2019/0035390 A1* | 1/2019 | Howard | G10L 15/30 |

FOREIGN PATENT DOCUMENTS

| | | |
|---|---|---|
| EP | 1259069 A1 | 11/2002 |
| EP | 3454332 A1 | 3/2019 |
| JP | 2006-215499 A | 8/2006 |
| JP | 2010-044776 A | 2/2010 |
| JP | 2015-520409 A | 7/2015 |
| JP | 2016-218852 A | 12/2016 |
| JP | 6511590 B1 | 5/2019 |
| KR | 10-2002-0087846 A | 11/2002 |
| WO | 2016/190060 A1 | 12/2016 |
| WO | 2017/147081 A1 | 8/2017 |
| WO | 2017/191713 A1 | 11/2017 |

* cited by examiner

FIG.6

```
{
    "Intent": "MUSIC-PLAY",
    "RelatedFunctions" : [
      {
          "Intent": "VOLUME_SET",
          "Phrase": "VOLUME",
          "Condition": "",
      },
      {
          "Intent": "MUSIC-FORWARD",
          "Phrase": "NEXT",
          "Condition": "NextSongExist",
      },
      {
          "Intent": "MuteGameSound",
          "Phrase": "GAME",
          "Condition": "PlayGame",
      }
    ]
}
```

FIG.7

```
"Items": [
  {
    "Speech": "REPLAY ARTIST B.",
    "Intent": "MUSIC-PLAY",
    "Entities": [
      {
        "Type": "TARGET_MUSIC",
        "Literal": "ARTIST B",
      }
    ],
    "Context": {
      "DateTimeString": "2018-04-16T17:34:55.8660832+09:00",
      "UserArea": "Kitchen",
      "UserAction": "Coocking",
      "RunningApp": "ChineseRecipes"
    }
  },
  {
    "Speech": "SET VOLUME TO 15.",
    "Intent": "BASICS-VOLUME_SET",
    "Entities": [
      {
        "Type": "NUMERIC",
        "Literal": "15"
      }
    ],
    "Context": {
      "DateTimeString": "2018-04-16T17:35:01.4780832+09:00",
      "UserArea": "Kitchen",
      "UserAction": "Coocking",
      "RunningApp": "ChineseRecipes"
    }
  },
  {
    "Speech": "WHAT'S THE NAME OF THIS MUSIC?",
    "Intent": "MUSIC-CHECK_CURRENT",
    "Entities": [
      {
        "Type": "TARGET",
        "Literal": "MUSIC",
      }
    ],
    "Context": {
      "DateTimeString": "2018-04-16T17:35:12.0540832+09:00",
      "UserArea": "Kitchen",
      "UserAction": "Coocking",
      "RunningApp": "ChineseRecipes"
    }
  },
]
```

FIG.8

```
"Items": [
    {
        "Speech":"FRIEND LIST.",
        "Intent": "ShowFriend",
        "Entities": [],
        "Context": {
            "DateTimeString": "2018-04-16T17:33:46.3090832+09:00",
            "GameName": "GameLand",
            "SceneName": "Stage4",
            "PlayerType": "Fighter"
        }
    },
    {
        "Speech":"SELECT THE THIRD PERSON.",
        "Intent": "SelectItem",
        "Entities": [
            {
                "Type": "SelectedItem",
                "Literal":"THE THIRD PERSON",
            }
        ],
        "Context": {
            "DateTimeString": "2018-04-16T17:33:56.2120832+09:00",
            "GameName": "GameLand",
            "SceneName": "Stage4",
            "PlayerType": "Fighter"
        }
    },
    {
        "Speech":"I'LL INVITE THIS PERSON.",
        "Intent": "CreateInvitation",
        "Entities": [],
        "Context": {
            "DateTimeString": "2018-04-16T17:34:01.2840832+09:00",
            "GameName": "GameLand",
            "SceneName": "Stage4",
            "PlayerType": "Fighter"
        }
    },
        :
    {
        "Speech":"SEND IT.",
        "Intent": "SendInvitation",
        "Entities": [],
        "Context": {
            "DateTimeString": "2018-04-16T17:34:12.5110832+09:00",
            "GameName": "GameLand",
            "SceneName": "Stage4",
            "PlayerType": "Fighter"
        }
    }
]
```

FIG.10

| FUNCTION STARTED | USER'S UTTERANCE FOR FUNCTION START | EXAMPLES OF UTTERANCES INCLUDING RELATED FUNCTION PHRASES | REGISTRATION CONDITION |
|---|---|---|---|
| MUSIC REPLAY | REPLAY MUSIC OF ARTIST B | MUTE GAME SOUND | USER IS PLAYING GAME WITH OUTPUT OF GAME SOUND |
| | | REPLAY THE NEXT MUSIC | THERE IS NEXT MUSIC (THE PRESENT MUSIC IS NOT THE LAST ONE) |
| | | REPLAY THE PREVIOUS MUSIC | THERE IS PREVIOUS MUSIC (THE PRESENT MUSIC IS NOT THE FIRST ONE) |
| ITEM SELECTION | SELECT THE FIRST | DELETE THE FIRST | THERE IS NUMBER TO BE SELECTED OR DELETED (IT IS PRESENTED TO THE USER) |
| | | SELECT THE THIRD | |
| MESSAGES | SHOW ME MESSAGES | SHOW ME ATTACHED PHOTOGRAPH | THERE IS ATTACHED FILE |
| | | SEND REPLY | THERE IS MESSAGE TO WHICH REPLY CAN BE SENT |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/009840 filed on Mar. 12, 2019, which claims priority benefit of Japanese Patent Application No. JP 2018-111946 filed in the Japan Patent Office on Jun. 12, 2018. Each of the above-referenced applications is hereby incorporated herein by reference in its entirety.

FIELD

The present invention relates to an information processing device and an information processing method.

BACKGROUND

In recent years, devices that provide various functions to users through voice interaction have become widespread. In addition, many techniques have been proposed for improving the convenience of users who use the above-described devices. For example, Patent Literature 1 discloses a technique that allows a user to customize a voice trigger for issuing an instruction to start voice interaction.

CITATION LIST

Patent Literature

Patent Literature 1: JP 2015-520409 A

SUMMARY

Technical Problem

According to the technique described in Patent Literature 1, a user can set a voice trigger according to their preferences. However, even with the use of the technique described in Patent Literature 1, the user is required to utter a predetermined voice trigger every time in order to issue an instruction to start voice interaction.

Therefore, the present disclosure proposes a novel and improved information processing device and information processing method that are capable of effectively reducing the input load related to a voice trigger.

Solution to Problem

According to the present disclosure, an information processing device is provided that includes: a registration control unit that dynamically controls registration of startup phrases used as start triggers of a voice interaction session, wherein the registration control unit temporarily additionally registers at least one of the startup phrases based on input voice.

Moreover, according to the present disclosure, an information processing device is provided that includes: a session control unit that controls start and end of a voice interaction session, wherein the session control unit starts the voice interaction session based on recognition of an utterance including a post-questioning phrase with intent of posing a post-question to an agent function, and transmits valid voice data buffered before the recognition of the post-questioning phrase to an external device.

Moreover, according to the present disclosure, an information processing method is provided that includes: dynamically controlling, by a processor, registration of startup phrases used as start triggers of a voice interaction session, wherein the controlling further includes temporarily additionally registering at least one of the startup phrases based on input voice.

Moreover, according to the present disclosure, an information processing method is provided that includes: controlling, by a processor, start and end of a voice interaction session, wherein the controlling further includes: starting the voice interaction session based on recognition of an utterance including a post-questioning phrase with intent of posing a post-question to an agent function; and transmitting valid voice data buffered before the recognition of the post-questioning phrase to an external device.

Advantageous Effects of Invention

As described above, according to the present disclosure, it is possible to effectively reduce the input load related to a voice trigger.

Note that the above-described effect is not necessarily restrictive, and any one of effects described in the present specification or any another effect obtainable from the present specification may be exhibited in addition to or in place of the above-described effect.

BRIEF DESCRIPTION OF DRAWINGS

FIG. 6 is a diagram illustrating an example of a function template according to the same embodiment.

FIG. 7 is a diagram illustrating an example of an operation log according to the same embodiment.

FIG. 8 is a diagram illustrating an example of an operation log according to the same embodiment.

FIG. 10 is a diagram illustrating an example of conditions for registration of related function phrases according to the same embodiment.

DESCRIPTION OF EMBODIMENTS

Figure 1:
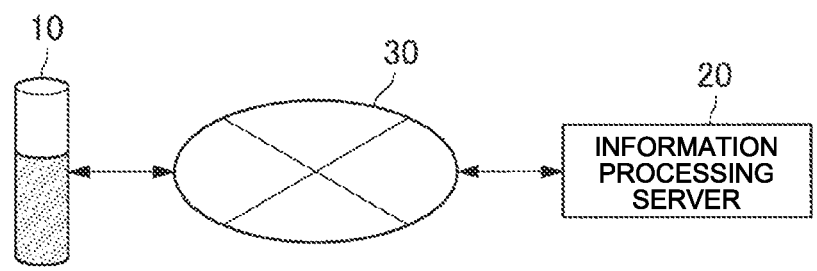
FIG. 1 is a block diagram illustrating a configuration example of an information processing system according to an embodiment of the present disclosure.

Favorable embodiments of the present disclosure will be described in detail with reference to the appended drawings. Note that, in the present specification and drawings, redundant description of a configuration element having substantially the same functional configuration is omitted by providing the same sign.

Note that the description will be given in the following order.

1. Embodiment
1.1. Background
1.2. System Configuration Example
1.3. Functional Configuration Example of Information Processing Terminal 10
1.4. Functional Configuration Example of Information Processing Server 20
1.5. Details of Functions
1.6. Effects
2. Hardware Configuration Example
3. Conclusion 1. Embodiment «1.1. Background»

First, a background of an embodiment of the present disclosure will be described. As described above, in recent years, devices that provide various functions to users through voice interaction have become widespread. The device as described above can start a voice interaction session with the user, for example, by recognizing a preset voice trigger (wake up word) via a local keyword voice recognition function. The device as described above, after the start of the voice interaction session, can implement the voice interaction with the user by transmitting voice data corresponding to the input user's utterance to an automatic voice recognition (ASR) function on the cloud and receiving response information based on the recognition result.

Here, the above startup word is generally determined in advance by a service provider or the like. On the other hand, Patent Literature 1 described above discloses a technique that allows the user to customize the startup word. According to this technique, each user can freely set the startup word according to their preferences and the like, thereby to improve the user experience.

However, even with the use of the technique described in Patent Literature 1, the user has to utter a predetermined startup word each time in order to issue an instruction for starting the voice interaction session, which brings the user under heavy input load.

Further, in order to reduce the input load related to the startup word, it is conceivable, for example, to lengthen the duration time of the voice interaction session to be started by the input of the startup word. In this case, however, there is a possibility that voice data not intended by the user, such as utterances made by the user to a subject other than the device, may be continuously transmitted to the cloud.

In addition, it is possible to start a voice interaction session with a more natural utterance by constantly registering a plurality of startup words that can be recognized by the local keyword voice recognition function. In this case, however, there may occur a phenomenon called "welling" in which the device erroneously responds to the utterance of the user that is not directed to the device.

The technical idea according to the present disclosure is devised in view of the above points, and makes it possible to effectively reduce the input load related to a voice trigger and to secure voice recognition accuracy and security. To this end, the information processing terminal 10 that implements an information processing method according to the embodiment of the present disclosure includes a registration control unit 140 that dynamically controls registration of a startup phrase to be used as a start trigger for a voice interaction session. In addition, the registration control unit 140 according to the embodiment of the present disclosure is characterized by temporarily additionally registering at least one startup phrase based on the input voice.

The startup phrase according to the present embodiment refers to a voice trigger such as a word, phrase, or clause that is dynamically registered and controlled to cause the information processing terminal 10 to start a voice interaction session. On the other hand, in the present embodiment, the startup word is a voice trigger statically set in advance by a service provider or the like. The startup phrase according to the present embodiment may include a post-questioning phrase, a related function phrase, a bridge phrase, and the like described later.

The information processing terminal 10 according to the present embodiment can dynamically temporarily register or deregister the startup phrase as described above to reduce the input load related to the voice trigger and ensure security at the same time. Hereinafter, the features of the information processing terminal 10 according to the present embodiment and the advantageous effects produced by the features will be described in detail.

«1.2. System Configuration Example»

First, a configuration example of the information processing system according to the embodiment of the present disclosure will be described. FIG. 1 is a block diagram illustrating a configuration example of the information processing system according to the present embodiment. Referring to FIG. 1, the information processing system according to the present embodiment includes an information processing terminal 10 and an information processing server 20. Further, the information processing terminal 10 and the information processing server 20 are connected to each other via a network 30 so as to be capable of communicating with each other.

(Information Processing Terminal 10)

The information processing terminal 10 according to the present embodiment is an information processing device that recognizes a startup phrase uttered by a user and starts a voice interaction session. The information processing terminal 10 according to the present embodiment performs voice interaction with the user by transmitting the acquired voice data to the information processing server 20 by streaming during the duration time of the voice interaction session, and by receiving response information generated based on an automatic voice recognition process and a natural language understanding (NLU) process of the voice data.

In addition, as described above, the information processing terminal 10 according to the present embodiment is characterized by temporarily additionally registering at least one startup phrase based on the input voice.

The information processing terminal 10 according to the present embodiment may be, for example, a smartphone, a tablet, a personal computer, or a wearable device. The information processing terminal 10 according to the present embodiment may also be a stationary or autonomous mobile dedicated terminal.

(Information Processing Server 20)

The information processing server 20 according to the present embodiment is an information processing device that performs the automatic voice recognition process and the natural language understanding process based on the voice data transmitted from the information processing terminal 10, and generates the response information corresponding to the voice data.

(Network 30)

The network 30 has a function of connecting the information processing terminal 10 and the information processing server 20. The network 30 may include a public line network such as the Internet, a telephone line network, and a satellite communication network, various local area networks (LAN) including Ethernet (registered trademark), a wide area network (WAN), and the like. In addition, the network 30 may include a dedicated line network such as an Internet protocol-virtual private network (IP-VPN). In addition, the network 30 may include a wireless communication network such as Wi-Fi (registered trademark) and Bluetooth (registered trademark).

A configuration example of an information processing system according to an embodiment of the present disclosure has been described above. The configuration described above with reference to FIG. 1 is merely an example, and the configuration of the information processing system according to the present embodiment is not limited to the example. The configuration of the information processing system according to the present embodiment can be flexibly transformed in accordance with specifications and operation.

«1.3. Functional Configuration Example of Information Processing Terminal 10»

Figure 2:
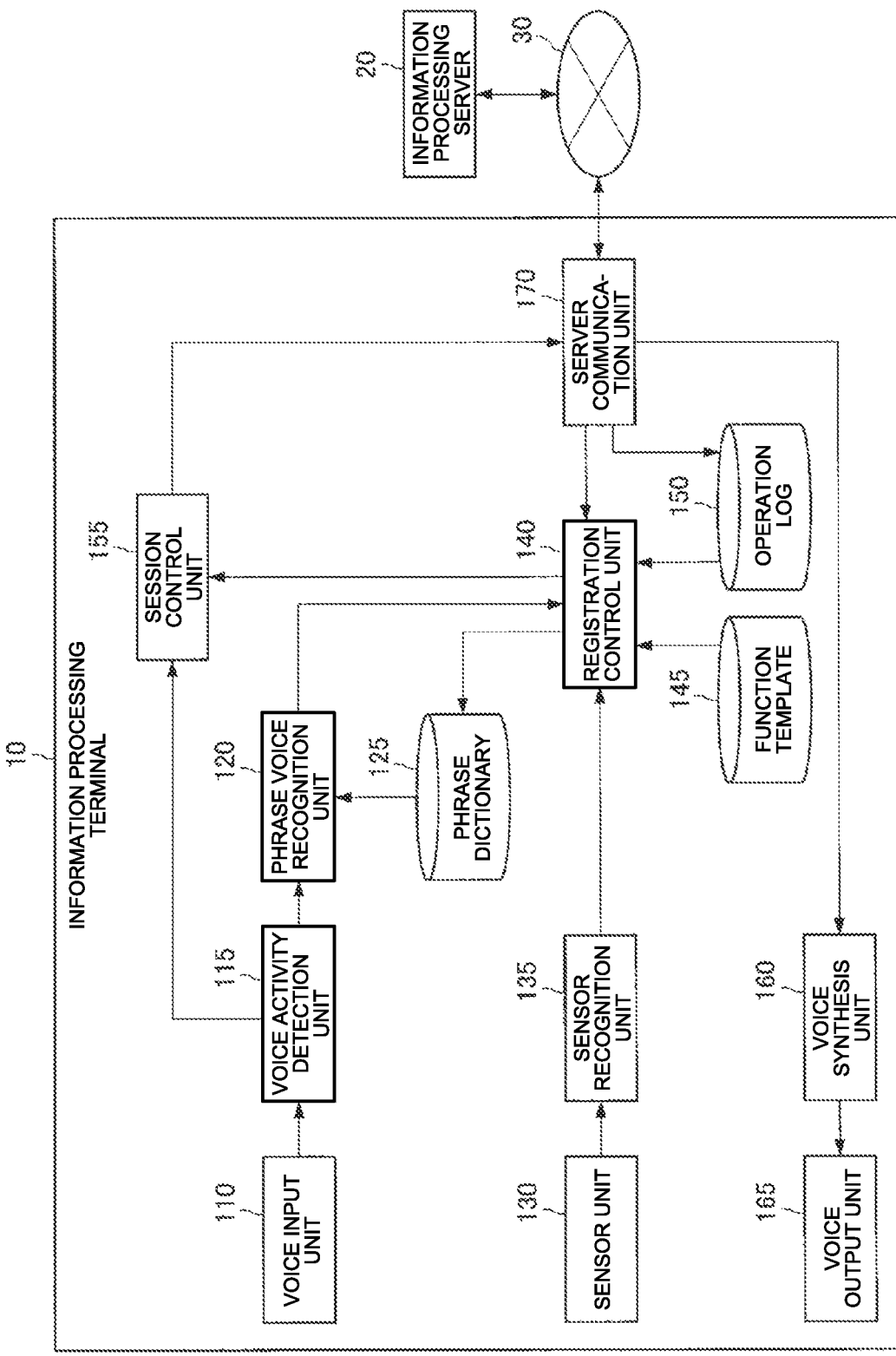
FIG. 2 is a block diagram illustrating a functional configuration example of an information processing terminal according to the same embodiment.

Next, a functional configuration example of the information processing terminal 10 according to an embodiment of the present disclosure will be described. FIG. 2 is a block diagram illustrating the functional configuration example of the information processing terminal 10 according to the present embodiment. Referring to FIG. 2, the information processing terminal 10 according to the present embodiment includes a voice input unit 110, a voice activity detection unit 115, a phrase voice recognition unit 120, a phrase dictionary 125, a sensor unit 130, a sensor recognition unit 135, a registration control unit 140, a function template 145, an operation log 150, a session control unit 155, a voice synthesis unit 160, a voice output unit 165, and a server communication unit 170.

(Voice Input Unit 110)

The voice input unit 110 according to the present embodiment has a function of collecting the user's utterances and sounds such as ambient sounds generated around the information processing terminal 10. The voice input unit 110 according to the present embodiment includes a microphone to collect sounds.

(Voice Activity Detection Unit 115)

The voice activity detection unit 115 according to the present embodiment performs voice activity detection (VAD) to detect a section in which a voice was uttered, from the sounds collected by the voice input unit 110. The voice activity detection unit 115 may perform, for example, voice activity detection based on the amplitude and zero crossing of a voice waveform, frame-based voice activity detection based on a mixed Gaussian distribution model, or voice activity detection based on hypothesis information being recognized by a decoder.

The voice activity detection unit 115 according to the present embodiment inputs the detected valid voice data and the utterance timings to the phrase voice recognition unit 120 and the session control unit 155.

(Phrase Voice Recognition Unit 120)

The phrase voice recognition unit 120 according to the present embodiment recognizes the startup phrase included in the valid voice data input from the voice activity detection unit 115, based on the startup phrases registered in the phrase dictionary 125. The phrase voice recognition unit 120 inputs the recognized startup phrase to the registration control unit 140.

(Sensor Unit 130)

The sensor unit 130 according to the present embodiment has a function of gathering various kinds of sensor information relating to peripheral environment and user action and state. The sensor unit 130 includes, for example, an optical sensor including an infrared ray sensor, an acceleration sensor, a gyro sensor, a geomagnetic sensor, a thermal sensor, a vibration sensor, an imaging sensor, a global navigation satellite system (GNSS) signal receiver, and the like.

(Sensor Recognition Unit 135)

The sensor recognition unit 135 according to the present embodiment performs various recognition processes based on the sensor information collected by the sensor unit 130. The sensor recognition unit 135 according to the present embodiment can recognize, for example, the user's action or state, the surrounding state, and the like from the above sensor information.

(Registration Control Unit 140)

The registration control unit 140 according to the present embodiment has a function of dynamically controlling registration of a startup phrase used as a start trigger of a voice interaction session in the phrase dictionary 125. One of the features of the registration control unit 140 according to the present embodiment is that at least one startup phrase is temporarily additionally registered in the phrase dictionary 125 based on the input voice.

According to the above-described function of the registration control unit 140 of the present embodiment, depending on the situation, adding an startup phrase that is supposed to be useful for starting a voice interaction session allows the user to start a voice interaction session with a natural flow of utterance without having to intentionally utter the predetermined startup word provided in advance by the service provider or the like.

Further, the registration control unit 140 according to the present embodiment may deregister the startup phrase temporarily added to the phrase dictionary 125 after the preset duration period has elapsed.

According to the above-described function of the registration control unit 140 of the present embodiment, it is possible to effectively reduce the possibility of welling due to long-term registration of the startup phrase.

The registration control unit 140 according to the present embodiment performs dynamic registration control of the above-described startup phrases, based on the user state recognized by the sensor recognition unit 135, the function template 145, the operation log 150, the results of a natural language understanding process by the information processing server 20, and the like. Details of functions of the registration control unit 140 according to the present embodiment will be separately described later.

(Function Template 145)

The function template 145 according to the present embodiment is data that defines the strength of relevance between a plurality of functions that the information processing terminal 10 or the information processing server 20 can execute.

(Operation Log 150)

The operation log 150 according to the present embodiment is information related to a history of operations performed by a user by an utterance, gesture, pressing a button, or the like.

(Session Control Unit 155)

The session control unit 155 according to the present embodiment has a function of controlling the start and end of a voice interaction session. The session control unit according to the present embodiment may start a voice interaction session, for example, based on the fact that the phrase voice recognition unit 120 has recognized an utterance including the startup phrase temporarily additionally registered by the registration control unit 140.

The session control unit 155 according to the present embodiment has a function of buffering a certain amount of valid voice data detected by the voice activity detection unit 115. Details of functions of the session control unit 155 according to the present embodiment will be separately described later.

(Voice Synthesis Unit 160)

The voice synthesis unit 160 according to the present embodiment performs voice synthesis (text to speech) based on the response information received from the information processing server 20.

(Voice Output Unit 165)

The voice output unit 165 according to the present embodiment has a function of outputting various voices including the voices synthesized by the voice synthesis unit 160. For this purpose, the voice output unit 165 according to the present embodiment includes a voice output device such as a speaker and an amplifier.

(Server Communication Unit 170)

The server communication unit 170 according to the present embodiment performs information communication with the information processing server 20 via the network 30. For example, the server communication unit 170 transmits buffered valid voice data to the information processing server 20 under the control of the session control unit 155. In addition, for example, the server communication unit 170 receives response information and the like generated based on the valid voice data, from the information processing server 20.

The functional configuration example of the information processing terminal 10 according to the embodiment of the present disclosure has been described above. Note that the above functional configuration described with reference to FIG. 2 is merely an example, and the functional configuration of the information processing terminal 10 according to the present embodiment is not limited to the example. The functional configuration of the information processing terminal 10 according to the present embodiment can be flexibly modified in accordance with specifications and operations.

«1.4. Functional Configuration Example of Information processing server 20»

Figure 3:
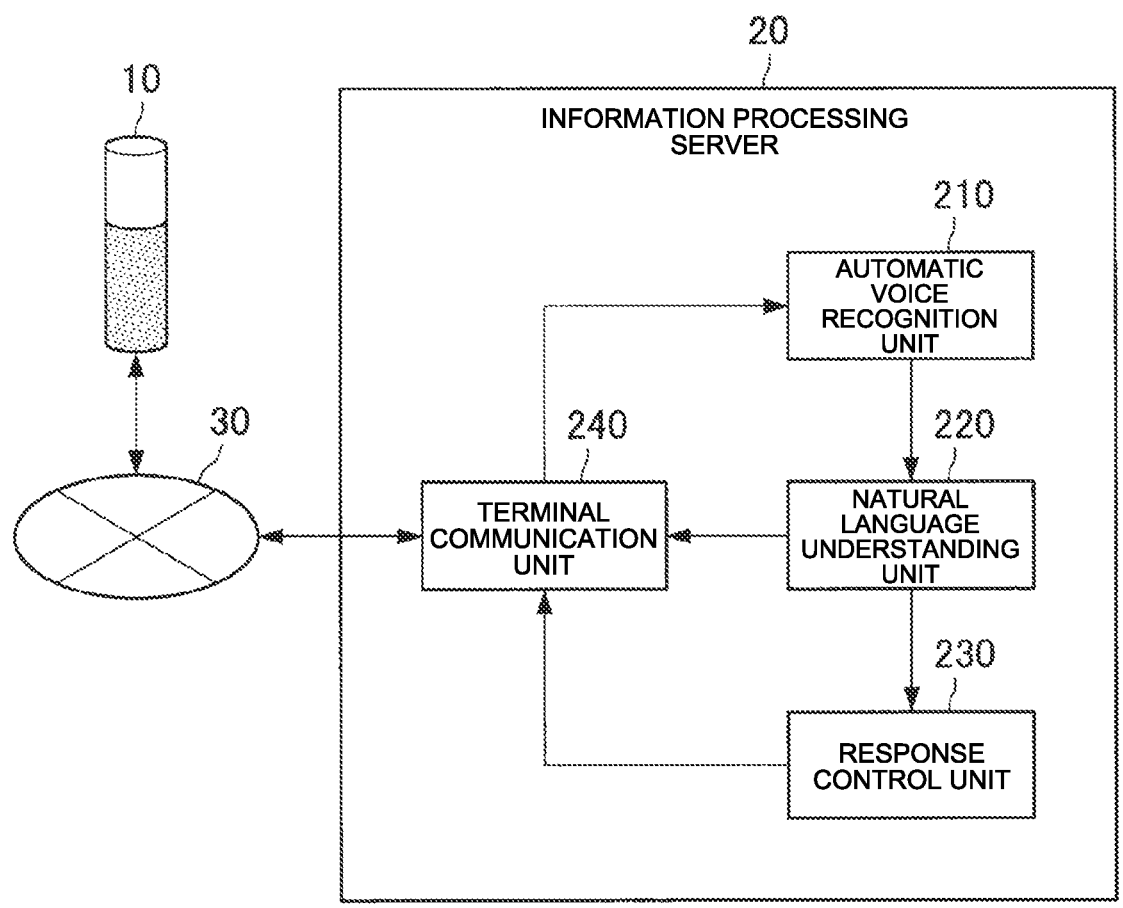
FIG. 3 is a block diagram illustrating a functional configuration example of an information processing server according to the same embodiment.

Next, a functional configuration example of the information processing server 20 according to an embodiment of the present disclosure will be described. FIG. 3 is a block diagram illustrating the functional configuration example of the information processing server 20 according to the present embodiment. Referring to FIG. 3, the information processing server 20 according to the present embodiment includes an automatic voice recognition unit 210, a natural language understanding unit 220, a response control unit 230, and a terminal communication unit 240.

(Automatic Voice Recognition Unit 210)

The automatic voice recognition unit 210 according to the present embodiment performs an automatic voice recognition process based on valid voice data transmitted from the information processing terminal 10 to generate uttered text.

(Natural Language Understanding Unit 220)

The natural language understanding unit 220 according to the present embodiment performs a natural language understanding process based on the uttered text generated by the automatic voice recognition unit 210, and analyzes the user's utterance intent.

(Response Control Unit 230)

The response control unit 230 according to the present embodiment generates response information to the user's utterance, based on the results of the natural language understanding process by the natural language understanding unit 220. The response information includes, for example, a text used for voice synthesis by the information processing terminal 10, a control signal related to voice output by the information processing terminal 10, and the like.

(Terminal Communication Unit 240)

The terminal communication unit 240 according to the present embodiment performs information communication with the information processing terminal 10 via the network 30. For example, the terminal communication unit 240 receives valid voice data from the information processing terminal 10. In addition, for example, the terminal communication unit 240 transmits the response information generated by the response control unit 230 to the information processing terminal 10.

The functional configuration example of the information processing server 20 according to the embodiment of the present disclosure has been described above. The configuration described above with reference to FIG. 3 is merely an example, and the functional configuration of the information processing server 20 according to the present embodiment is not limited to the example. The functional configuration of the information processing server 20 according to the present embodiment can be flexibly modified in accordance with specifications and operations.

«1.5. Details of Functions»

Next, the control of dynamic registration of a startup phrase and the control of a voice interaction session according to the present embodiment will be described in detail. As described above, the registration control unit 140 according to the present embodiment has a function of temporarily registering startup phrases such as a post-questioning phrase, a related function phrase, or a bridge phrase in the phrase dictionary 125, based on the input voice.

First, a post-questioning phrase according to the present embodiment will be described in detail. A post-questioning phrase in the present embodiment may be a sort of startup phrase with intent of posing a post-question to the agent function. The registration control unit 140 according to the present embodiment has a feature of temporarily additionally registering at least one post-questioning phrase to the phrase dictionary 125 after a predetermined time (for example, a time of about one clause) from detection of a voice section by the voice activity detection unit 115.

Figure 4:
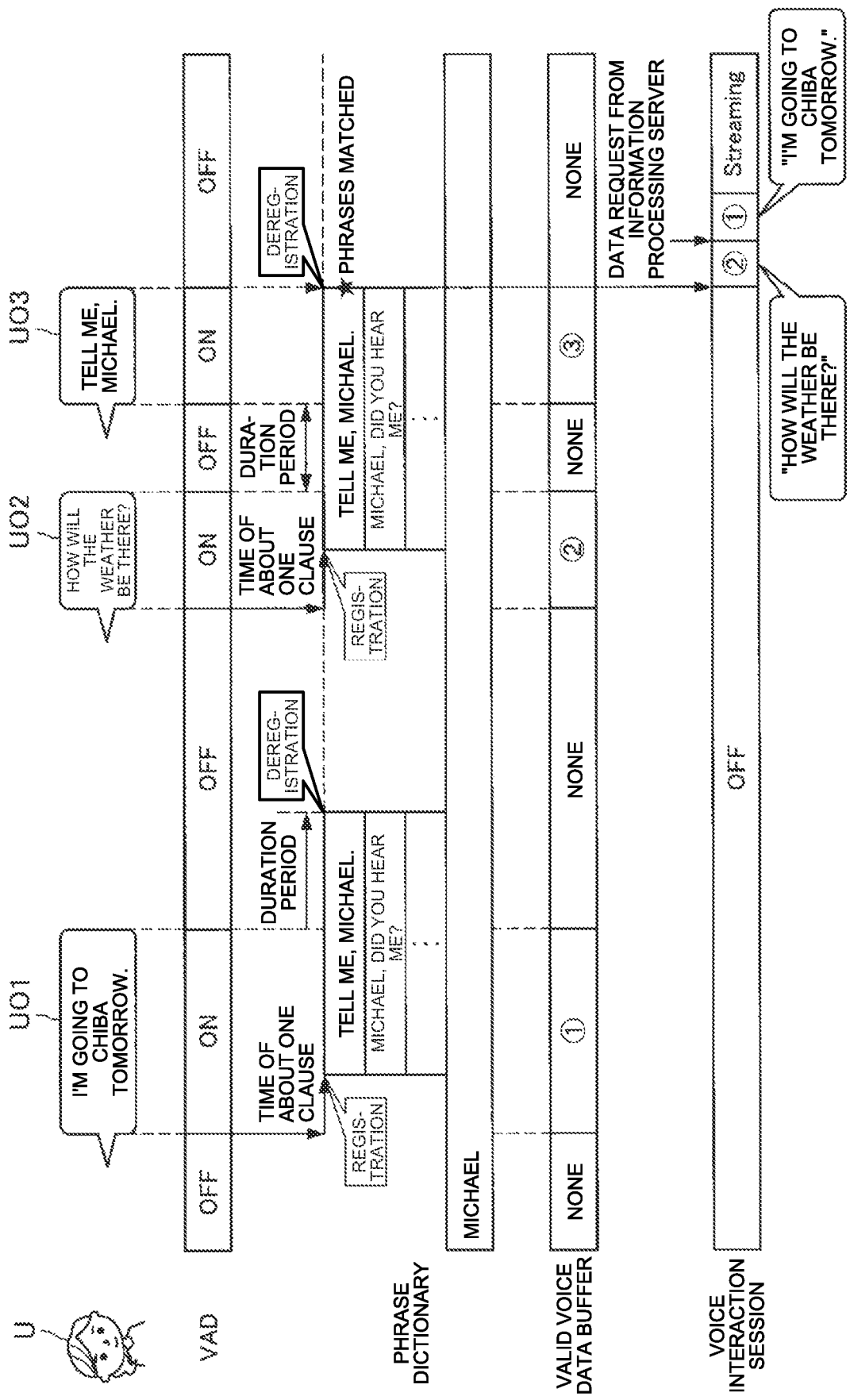
FIG. 4 is a diagram for explaining post-questioning phrases according to the same embodiment.

FIG. 4 is a diagram for explaining post-questioning phrases according to the present embodiment. FIG. 4 chronologically illustrates utterances UO1 to UO3 of a user U, the results of voice activity detection (VAD), the registrations of the phrase dictionary 125, valid voice data to be buffered, and the status of a voice interaction session.

In the case of the example illustrated in FIG. 4, only the startup word "Michael" statically set in advance by the service provider or the like is registered in the phrase dictionary 125. Such a startup word is not to be controlled by the registration control unit 140 but is constantly registered in the phrase dictionary 125.

As illustrated in FIG. 4, when the user U performs the utterance UO1, the voice activity detection unit 115 activates VAD (ON), and the session control unit 155 buffers the valid voice data corresponding to the utterance UO1.

On one hand, since the utterance UO1 does not include the startup word "Michael" registered in the phrase dictionary 125, the session control unit 155 does not start a voice interaction session.

On the other hand, based on activation of the VAD with the utterance UO1, the registration control unit 140 according to the present embodiment temporarily additionally registers a post-questioning phrase in the phrase dictionary 125 after a lapse of a predetermined time from the timing when the VAD becomes activated (e.g., one second corresponding to a time of about one clause). The registration control unit 140 registers a post-questioning phrase after a time of about one clause from the timing when the VAD becomes activated, so that it is possible to prevent detection of a post-questioning phrase without a pre-utterance to be transmitted to the information processing server 20 (that is, the user's utterance with intent of performing an input to the system).

In the case of the example illustrated in FIG. 4, the registration control unit 140 registers post-questioning phrases such as "Tell me, Michael" and "Michael, did you hear me?" in the phrase dictionary 125.

The registration control unit 140 according to the present embodiment temporarily deregisters the post-questioning phrases from the phrase dictionary 125 after a lapse of a predetermined duration period from the timing when the VAD becomes deactivated. In the case of the example illustrated in FIG. 4, based on the lapse of the duration period from the deactivation of the VAD corresponding to the user's utterance UO1, the registration control unit 140 deletes the post-questioning phrases such as Tells me, Michael" and "Michael, did you hear me?" from the phrase dictionary 125.

In the case of the example illustrated in FIG. 4, the user U performs the utterance UO2 to ask a question about the weather, following the utterance UO1. At this time, the registration control unit 140 temporarily registers the post-questioning phrases in the phrase dictionary 125 after a lapse of a time of about one clause since VAD became activated, as in the above-described processing.

When a post-questioning phrase is registered in the phrase dictionary 125 and the utterance UO3 including the post-questioning phrase is performed as illustrated in the diagram, the session control unit 155 according to the present embodiment starts a voice interaction session based on the fact that the phrase voice recognition unit 120 has recognized the utterance UO3 including the post-questioning phrase, and transmits the valid voice data buffered immediately before the recognition of the post-questioning phrase, to the information processing server 20 via the server communication unit 170.

In the case of the example illustrated in FIG. 4, based on the recognition of the utterance UO3 including the post-questioning phrase "Tell me, Michael." registered in the phrase dictionary 125, the session control unit 155 transmits the valid voice data "2" corresponding to the utterance UO2, to the information processing server 20.

In this way, according to the information processing terminal 10 of the present embodiment, transmitting the valid voice data corresponding to the utterance UO2 for asking about the weather to the information processing server 20 based on the recognition of the utterance UO3 including the post-questioning intent makes it possible to realize voice interaction according to the user's intent even without the preliminary startup word.

If the utterance UO3 includes a clause other than the post-questioning phrase, the session control unit 155 may transmit only the first half part of the valid voice data "3" corresponding to the utterance UO3 and excluding the post-questioning phrase, to the information processing server 20. At this time, the session control unit 155 can refer to a time stamp of post-questioning phrase detection start to extract the first half part including the post-questioning phrase from the valid voice data.

When the temporarily added post-questioning phrase is recognized and the voice interaction session is started, the registration control unit 140 according to the present embodiment deregisters the post-questioning phrase from the phrase dictionary 125.

After the transmission of the valid voice data, when receiving a request for additional data from an external device installed in the cloud or the like (in this case, the information processing server 20), the session control unit 155 according to the present embodiment may transmit other valid voice data buffered immediately before the already transmitted valid voice data to the external device. The session control unit 155 may repeatedly execute the above process until it receives a notification of completion of the natural language understanding process from the information processing server 20.

For example, in the case of the example illustrated in FIG. 4, the information processing server 20 performs the natural language understanding process based on the valid voice data "2" corresponding to the utterance UO2 transmitted from the session control unit 155, thereby to analyze the intent of the utterance. At this time, the information processing server 20 can presume that the valid voice data "2" indicates the intent of checking the weather, but determines that there is insufficient information as to the time and location of which the weather forecast is to be presented.

In this way, when the information necessary for making an accurate response is insufficient, the information processing server 20 may request the information processing terminal 10 to transmit additional valid voice data. The information processing server 20 according to the present embodiment can perform the above process by a technique such as SlotFilling, for example.

In addition, when an automatic voice recognition result of the received valid voice data includes a demonstrative indicating a target in a past utterance such as "that", the information processing server 20 may request additional valid voice data for identifying the target from the information processing terminal 10.

If no necessary information for accurately executing the function remains available even after repeatedly requesting the additional valid voice data for a predetermined number of times, the information processing server 20 may generate response information for causing the information processing terminal 10 to make question answering such as "the weather of what place do you mean?" and transmit the response information to the information processing terminal 10.

On the other hand, when the information necessary for accurately executing the function is available, the information processing server 20 transmits a notification of completion of the natural language understanding process to the information processing terminal 10. At this time, the session control unit 155 starts a voice interaction session by normal input voice streaming based on the reception of the above-mentioned completion notification.

In the case of the example illustrated in FIG. 4, based on the fact that it is known that the weather in Chiba can be presented from the valid voice data "1" corresponding to the utterance UO1 transmitted in response to the request for the additional valid voice data, the information processing server 20 transmits a notification of completion of the natural language understanding process to the information processing terminal 10, and the session control unit 155 starts a voice interaction session by normal input voice streaming in response to the notification of completion.

In this way, according to the information processing terminal 10 of the present embodiment, after recognition of the post-questioning phrase, sequentially transmitting the valid voice data buffered in the past in response to a request from the information processing server 20 makes it possible to fulfill information necessary for the information processing server 20 to perform the natural language understanding process.

According to the above-described function of the information processing terminal 10 of the present embodiment, depending on the situation, the user can start a voice interaction session with a natural flow of utterance without having to intentionally utter the predetermined startup word provided in advance by the service provider or the like.

Next, another usage example of post-questioning phrases according to the present embodiment will be described. In the following description, the part enclosed in < > is a post-questioning phrase, and the part enclosed in ( ) is an utterance corresponding to the valid voice data buffered one or more preceding the post-questioning phrase.

To present today's weather information of the user's current location
"(Is the weather going to be okay today?)<Do you know that? Michael.>"

To present the seismic intensity of the user's current location from the Earthquake Early Warning system
"(How much is the current seismic intensity?)<How? Michael.>"

To present special dish information and today's reservation status from an Italian restaurant
"(I want to eat Italian food today.)<Did you hear, Michael?>"

To send an invitation with the party settings of the game that was set up yesterday stored in the operation log 150
"(We'll do it at the same party as yesterday.)<Michael, take care of things.>"

To memorize that 80 km is suitable for a specific scene (the second corner) of a race game being played, and notify when the same scene comes next time "(80 km is good for the second corner.)<Michael, remember it.>"

To present the schedules of another user
"(Is dad having dinner at home today?)<Do you know?>"

The last one of examples listed above does not include the pre-registered startup word "Michael". In this way, a post-questioning phrase according to the present embodiment does not necessarily have to include a startup word predetermined by the service provider or the like. In this case, the information processing terminal 10 may recognize "Do you know?" as a post-questioning phrase only when it is estimated from the recognized user's face direction and line of sight that the phrase was uttered with an intent of performing an input to the information processing terminal 10.

The valid voice data transmitted by the recognition of a post-questioning phrase according to the present embodiment is not limited to data corresponding to the past utterances of the user who has issued the post-questioning phrase. The valid voice data transmitted by the recognition of a post-questioning phrase may correspond to the utterance of another user or the voice output from a television device or the like.

For example, after a television device outputs a voice such as "What is the biggest lake in the world?" in a quiz show, when the user says "Do you know the answer to this quiz, Michael?", the session control unit 155, as described above, may sequentially transmits the valid voice data to the information processing server 20, receive the response information related to the answer to the quiz, and present it to the user.

The post-questioning phrases according to the present embodiment have a useful effect even without dynamic registration control by the registration control unit 140. That is, the post-questioning phrases as described above may be statically registered in the phrase dictionary 125 in advance. Also in this case, the session control unit 155 according to the present embodiment can provide the advantageous effect as described above by starting a voice interaction session based on the recognition of an utterance including a statically registered post-questioning phrase, and transmitting the valid voice data that has been buffered before the recognition of the post-questioning phrase to the information processing server 20.

Figure 5:
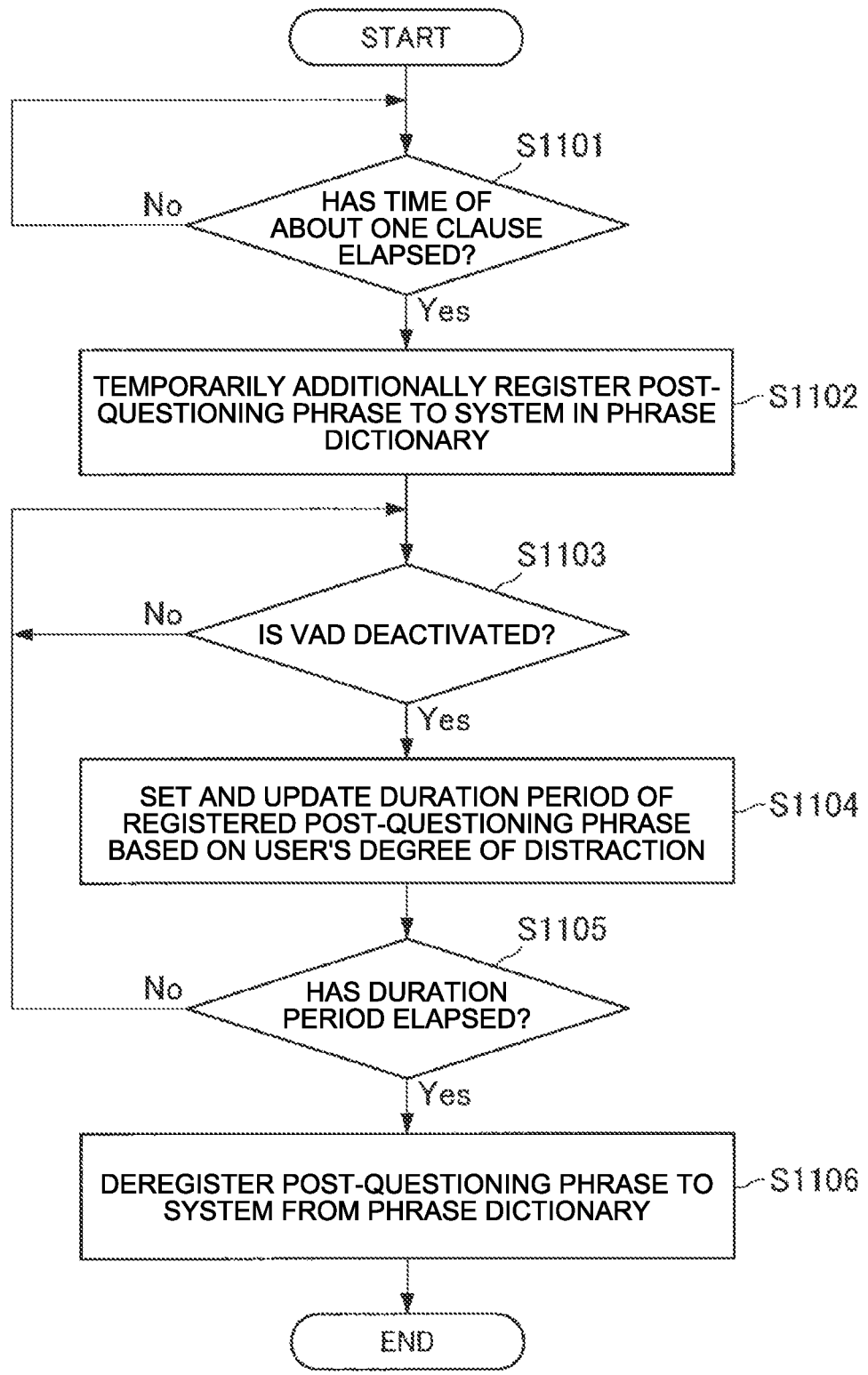
FIG. 5 is a flowchart illustrating a flow of registration control of a post-questioning phrase according to the same embodiment.

Next, a flow of registration control of a post-questioning phrase according to the present embodiment will be described. FIG. 5 is a flowchart illustrating a flow of registration control of a post-questioning phrase according to the present embodiment. FIG. 5 illustrates a control flow from the timing when VAD becomes activated when the voice interaction session is deactivated.

Referring to FIG. 5, when the voice interaction session is deactivated, the registration control unit 140 determines whether a time of about one clause has elapsed after the VAD became activated (S1101).

When a time of about one clause has elapsed (S1101: Yes), the registration control unit 140 temporarily additionally registers at least one or more post-questioning phrases in the phrase dictionary 125 (S1102).

Next, the registration control unit 140 determines whether the VAD has become deactivated (S1103).

When the VAD has become deactivated (S1103: No), the registration control unit 140, based on the "degree of distraction" indicating how much the user commits themselves to events other than the voice interaction session, sets and updates the duration period of the registered post-questioning phrase (S1104). The "degree of distraction" according to the present embodiment will be separately described in detail.

Next, the registration control unit 140 determines whether the duration time set in step S1104 has elapsed (S1105).

When the duration period has elapsed (S1105: Yes), the registration control unit 140 deregisters the post-questioning phrase from the phrase dictionary 125 (S1106).

When any utterance including a post-questioning phrase registered in the phrase dictionary 125 is recognized in the above steps S1102 to S1106, the registration control unit 140 stops the above flow, and the session control unit 155 starts session control based on start phrase recognition described later.

Next, a related function phrase according to the present embodiment will be described in detail. The related function phrase according to the present embodiment is a sort of startup phrase with intent of issuing an instruction for executing another function that is highly related to the function executed by the user's utterance. The registration control unit 140 according to the present embodiment may temporarily additionally register at least one related function phrase in the phrase dictionary 125 based on a function being executed by the user.

The relationship between the functions according to the present embodiment includes not only the relationship focusing on the characteristics of the functions but also the relationship focusing on the frequencies with the functions are executed.

More specifically, when a predetermined function is executed by the user's utterance or button depression or the like, the registration control unit 140 according to the present embodiment, based on the relationship between functions related to the frequencies with which the functions are used, which are detected from the function template 145 defined based on the strength of the relationship in characteristics between the functions and from the operation log 150, may temporarily additionally register a related function phrase with intent of issuing an instruction for execution of another function highly related to the executed function, which is predicted to be subsequently uttered by the user, in the phrase dictionary 125.

FIG. 6 is a diagram illustrating an example of the function template 145 according to the present embodiment. In the case of the example illustrated in FIG. 6, the function template 145 defines a plurality of functions that are strongly related to music replay. Specifically, the function template 145 illustrated in FIG. 6 defines volume settings, transition to the next music, mute settings for game music, and the like as functions highly related to music replay. The registration control unit 140 according to the present embodiment can refer to the function template 145 as described above to temporarily additionally register related function phrases with intent of volume settings, transition to the next music, or issuing an instruction for execution of mute setting for game music during music replay, in the phrase dictionary 125.

FIGS. 7 and 8 are diagrams illustrating examples of the operation log 150 according to the present embodiment. In the case of the example illustrated in FIG. 7, the operation log 150 stores a history of operations relating to music replay performed by the user in the past together with information on contexts recognized during the operations. The registration control unit 140 according to the present embodiment can refer to the operation log 150 as described above to temporarily additionally register related function phrases with intent of issuing an instruction for making a volume setting or presenting a music title during music replay, in the phrase dictionary 125.

In the case of the example illustrated in FIG. 8, the operation log 150 stores a history of operations relating to transmission of an invitation to a game performed by the user in the past together with information on contexts recognized during the operations. The registration control unit 140 according to the present embodiment can refer to the operation log 150 as described above to temporarily additionally register related function phrases with intent of issuing an instruction for selecting a friend(s), creating an invitation, transmitting the invitation, or the like during display of a friend list, in the phrase dictionary 125.

Figure 9:
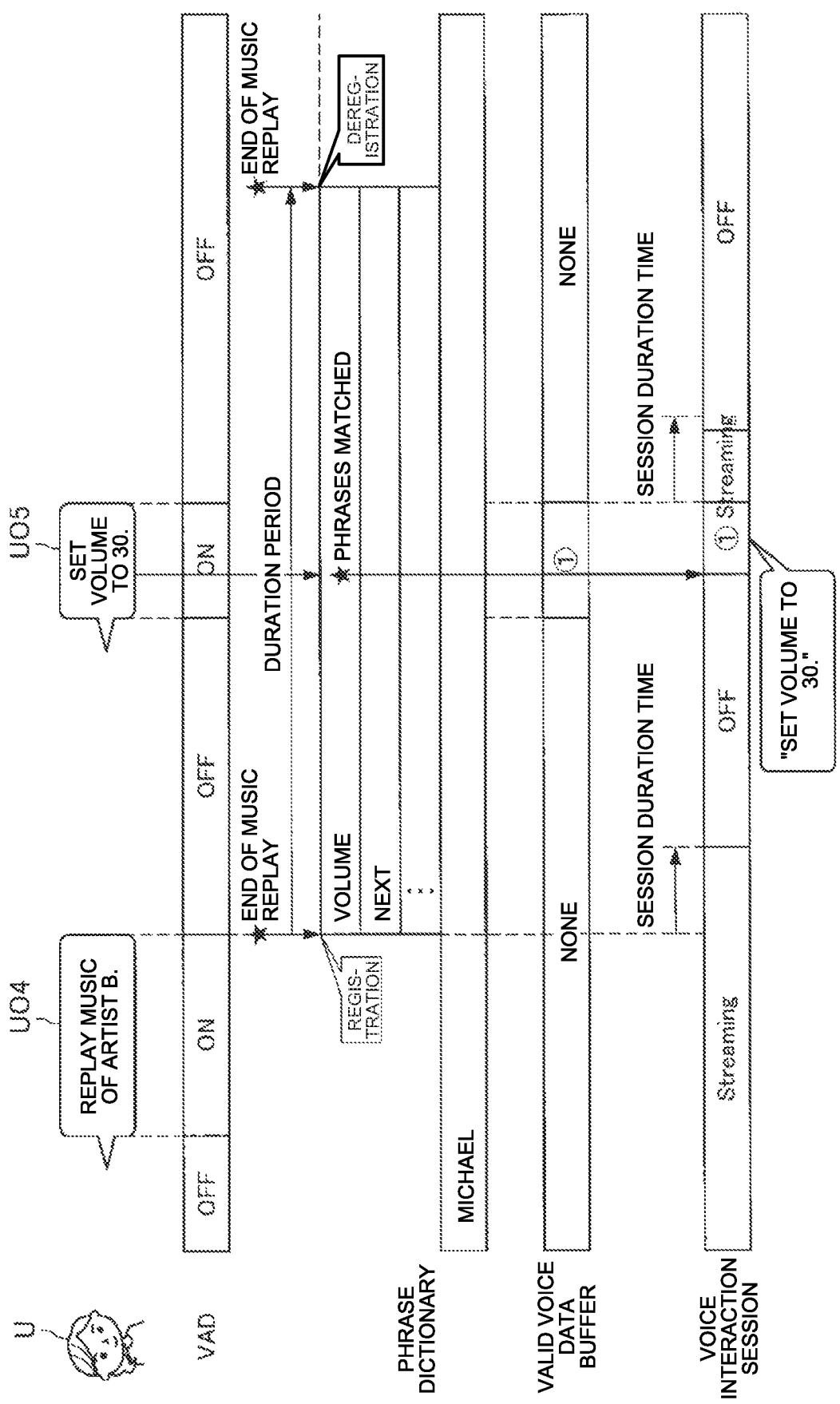
FIG. 9 is a diagram for explaining related function phrases according to the same embodiment.

Referring to FIG. 9, the registration control of related function phrases according to the present embodiment will be described with a specific example. FIG. 9 is a diagram for explaining related function phrases according to the same embodiment.

In the case of the example illustrated in FIG. 9, first, when a voice interaction session is started, the music replay function is executed based on the recognition of an utterance UO4 of the user for issuing an instruction to replay the music of an artist B.

At this time, based on the function template 145 as illustrated in FIG. 6, the registration control unit 140 according to the present embodiment can temporarily additionally register related function phrases such as "volume" related to an instruction for volume setting and "next" related to an instruction for transition to the next music, which are predicted to be subsequently uttered by the user U, in the phrase dictionary 125.

In addition, for example, when it is detected from the operation log 150 as illustrated in FIG. 7 or the like that the user U frequently issues an instruction to present a music title after the music replay, the registration control unit 140 may temporarily additionally register related function phrases such as "this" and "this music" related to an instruction to present a music title, which are predicted to be subsequently uttered by the user U, in the phrase dictionary 125 based on the operation log 150.

The execution of the function does not necessarily have to be started by the utterance. The execution of the function may be started by a gesture, a press on a button, a remote controller operation, or the like, besides the utterance. The registration control unit 140 can refer to the function template 145 or the operation log 150, for example, with the start of music replay by a button operation as a trigger, to temporarily register the related function phrases as described above in the phrase dictionary 125.

After the additional registration of the related function phrases, the registration control unit 140 according to the present embodiment deregisters the related function phrases from the phrase dictionary 125 when the duration period has elapsed. For example, in the example illustrated in FIG. 9, the registration control unit 140 defines the period of time from the start of the music replay function by the user to the end thereof as the duration period, and deregisters the related function phrases at the end of the music replay.

In the normal case, if VAD does not become activated within a predetermined time (e.g., several seconds) after recognition of the startup word, the voice interaction session is deactivated. However, according to the above-described function of the registration control unit 140 of the present embodiment, it is possible to execute another function that is highly related to the function during execution of the predetermined function without the startup word, thereby effectively improving the convenience for the user.

When an utterance including a related function phrase is recognized based on the related function phrase temporarily registered in the phrase dictionary 125, the session control unit 155 according to the present embodiment transmits the buffered valid voice data corresponding to the utterance to the information processing server 20 to start a voice interaction session by normal input voice streaming.

In the case of the example illustrated in FIG. 9, based on the recognition of the utterance UO5 including the related function phrase "volume", the session control unit 155 transmits the valid voice data "1" corresponding to the utterance UO5 to the information processing server 20. At this time, the session control unit 155 may switch to normal input voice streaming with the timing when the transmission of the buffered valid voice data "1" of the utterance UO5 has completed (that is, the transmission of the buffered valid voice data has caught up with the utterance). On the other hand, the concept of the voice interaction session according to the present embodiment may include both transmission of buffered valid voice data and normal input voice streaming.

Next, other usage examples of related function phrases according to the present embodiment will be described. In the following, the part enclosed in ( ) is a user's utterance for issuing an instruction to execute a predetermined function, and the part enclosed in < > is a related function phrase that is strongly related to the function (and that the user is predicted to utter next).

To register a related function phrase based on the function template 145 or the operation log 150 related to a party invitation function "(Create an invitation.) . . . <Send it now.>"

To register a related function phrase based on the frequency with which to be detected from the operation log 150 and executed "(Set the alarm for seven a.m.) . . . <Turn off the light.>"

To register a related function phrases based on the function template 145 related to a timer function "(Set the timer for three minutes.) . . . <Cancel the timer.>"

To register a related function phrases based on the function template 145 related to a message function "(Show me a message.) . . . <I'll reply.>"

To register a related function phrase based on the function template 145 or the operation log 150 related to a cooking recipe display function "(Show me the recipe.) . . . <What's the next step?>"

The registration control unit 140 according to the present embodiment may determine a related function phrase to be temporarily registered in the phrase dictionary 125, based on the state of the function being executed. For example, the registration control unit 140 may register a related function phrase only when the status of the function being executed matches the condition for registration of the related function phrase defined in the function template 145 or the like.

FIG. 10 is a diagram illustrating an example of conditions for registration of related function phrases according to the present embodiment. In the case of the example illustrated in FIG. 10, for example, the registration control unit 140 may register the related function phrase "game" related to the music replay function in the phrase dictionary 125 only when "a game is being played and game sound is being output".

In addition, for example, the registration control unit 140 may register the related function phrases "the first" and "the third" related to an item selection function in the phrase dictionary 125 only when "there are numbers to be selected or deleted (presented to the user)".

Further, for example, the registration control unit 140 may register the related function phrase "attachment" related to the message function in the phrase dictionary 125 only when "there is an attached file".

According to the above-described functions of the registration control unit 140 of the present embodiment, it is possible to avoid registration of unnecessary related function words by taking into account the execution states of the functions, and it is possible to effectively prevent welling from daily conversation or the like.

The registration control unit 140 according to the present embodiment can also perform registration control of the related function phrases based on the recognized context. As described above, the operation log 150 according to the present embodiment stores the operation history of the user and the contexts recognized during the operation. The registration control unit 140 according to the present embodiment may temporarily register related function phrases related to functions executed with high frequencies under predetermined context conditions based on various contexts including the date and time, place, user's status, function status, and the like stored in the operation log 150 in the phrase dictionary 125 when the context conditions are recognized, and may deregister the related function phrases when the context conditions are no longer recognized.

For example, in the case of the example illustrated in FIG. 7, the registration control unit 140 may temporarily register the related function phrases related to the replay of music of the artist B in the phrase dictionary 125 when the context condition "the user is cooking Chinese food" is recognized, and may deregister the related function phrases when the context condition is no longer recognized.

In addition, for example, in the case of the example illustrated in FIG. 8, the registration control unit 140 may temporarily register the related function phrases related to the friend list display or the like in the phrase dictionary 125 when the context condition "the user is playing GameLand Stage 4 as a fighter", and may deregister the related function phrases when the context condition is no longer recognized.

Further, for example, when the first clause of a phrase that is frequently uttered on Wednesday night is detected from the operation log 150 and the context condition "Wednesday night" is recognized, the registration control unit 140 can temporarily register the extracted clause as a related function phrase in the phrase dictionary 125.

According to the above-described functions of the registration control unit 140 of the present embodiment, it is possible to avoid registration of unnecessary related function words by taking into account various context conditions, and it is possible to effectively prevent welling from daily conversation or the like.

If the information processing terminal 10 includes a display unit that presents visual information, the registration control unit 140 according to the present embodiment may temporarily register the text displayed on the display unit in the phrase dictionary 125 as a related function phrase.

For example, when a text such as "stop" or "next music" is displayed on the display unit during music replay, it is predicted that the user is likely to make an utterance including the text. Therefore, the registration control unit 140 according to the present embodiment can temporarily register the displayed text in the phrase dictionary 125 as a related function phrase, thereby allowing the user to issue an instruction to execute the function corresponding to the text without a startup word.

Figure 11:
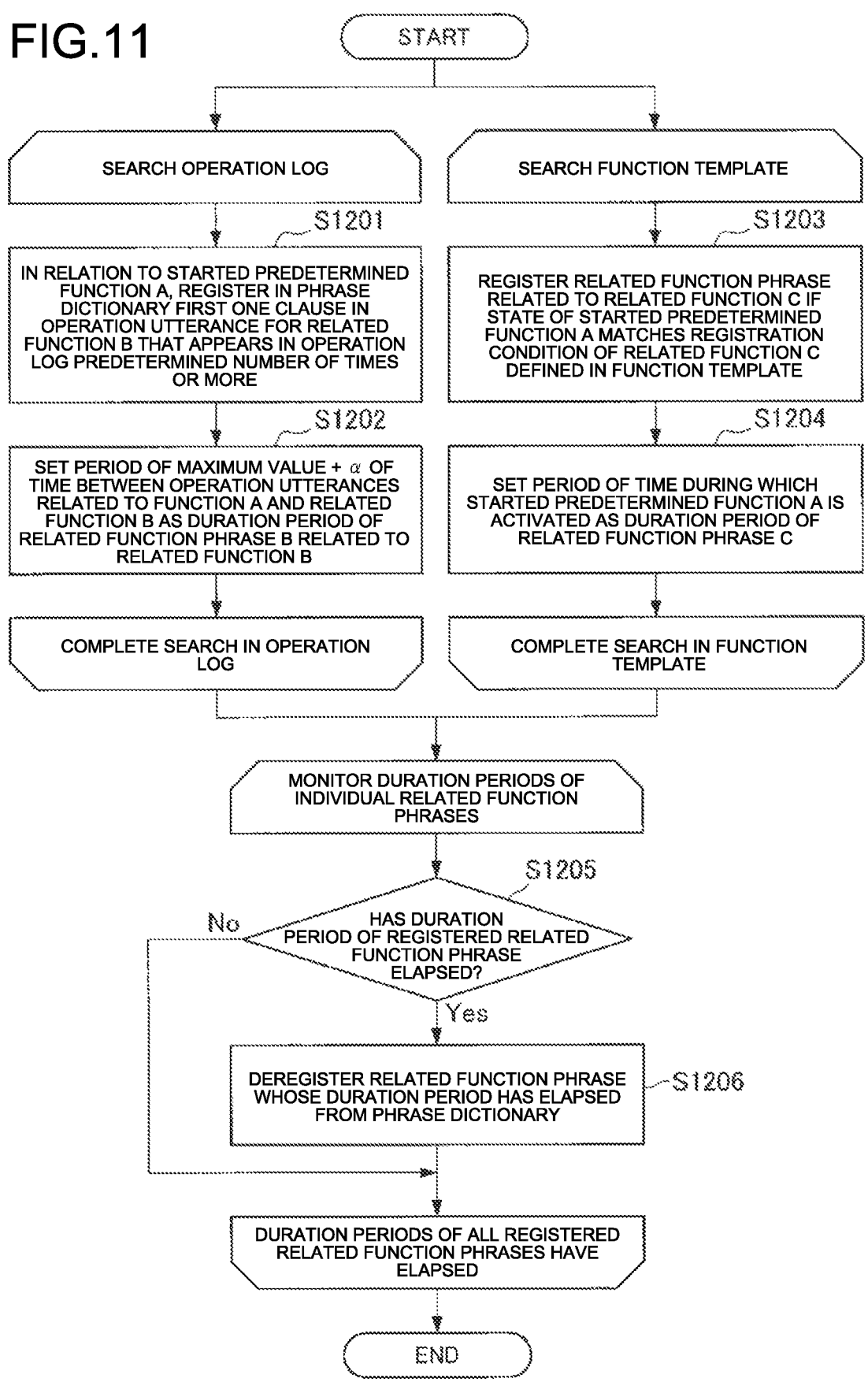
FIG. 11 is a flowchart illustrating a flow of registration control of a related function phrase according to the same embodiment.

Next, a flow of registration control of a related function phrase according to the present embodiment will be described. FIG. 11 is a flowchart illustrating a flow of registration control of a related function phrase according to the present embodiment. FIG. 11 illustrates a control flow from the timing when the user executes a predetermined function A.

Referring to FIG. 11, when the user starts the predetermined function A, the registration control unit 140 repeatedly executes the following processes on the operation log 150 and the function template 145.

First, the process on the operation log 150 will be described. In relation to the started predetermined function A, the registration control unit 140 temporarily registers, in the phrase dictionary 125, the first clause of an operation utterance of a related function B appearing in the operation log 150 a predetermined number of times or more as a related function phrase B (S1201).

Next, the registration control unit 140 sets the period of time of the maximum value+a between the operation utterances of the function A and the related function B as the duration period of the related function phrase B related to the related function B (S1202). The setting of the duration period according to the present embodiment will be described in detail separately.

Next, the process on the function template 145 will be described. When the status of the started predetermined function A matches the registration condition of a related function C defined on the function template 145, the registration control unit 140 temporarily registers a defined related function phrase C in the phrase dictionary 125 (S1203).

Next, the registration control unit 140 sets the period of time during which the function A is activated, that is, the period of time until the execution of the function A is completed, as the duration period of the related function phrase C related to the related function C (S1204).

When steps S1201 to S1204 described above are completed, the registration control unit 140 then monitors the duration period of each registered related function phrase.

Specifically, the registration control unit 140 determines whether the duration period of each registered related function phrase has elapsed (S1205).

When the duration period has elapsed (S1205: Yes), the registration control unit 140 deregisters the related function phrase whose duration period has elapsed from the phrase dictionary 125 (S1206).

The registration control unit 140 individually carries out steps S1205 to S1206 on all the registered related function phrases. When any utterance including a related function phrase registered in the phrase dictionary 125 is recognized in the above steps S1205 and S1206, the registration control unit 140 stops the above flow, and the session control unit 155 starts session control based on startup phrase recognition described later.

Next, a bridge phrase according to the present embodiment will be described in detail. A bridge phrase according to the present embodiment is a sort of startup phrase with intent of inheriting an interaction context. The registration control unit 140 according to the present embodiment may temporarily additionally register at least one bridge phrase based on the end of a voice interaction session.

Figure 12:
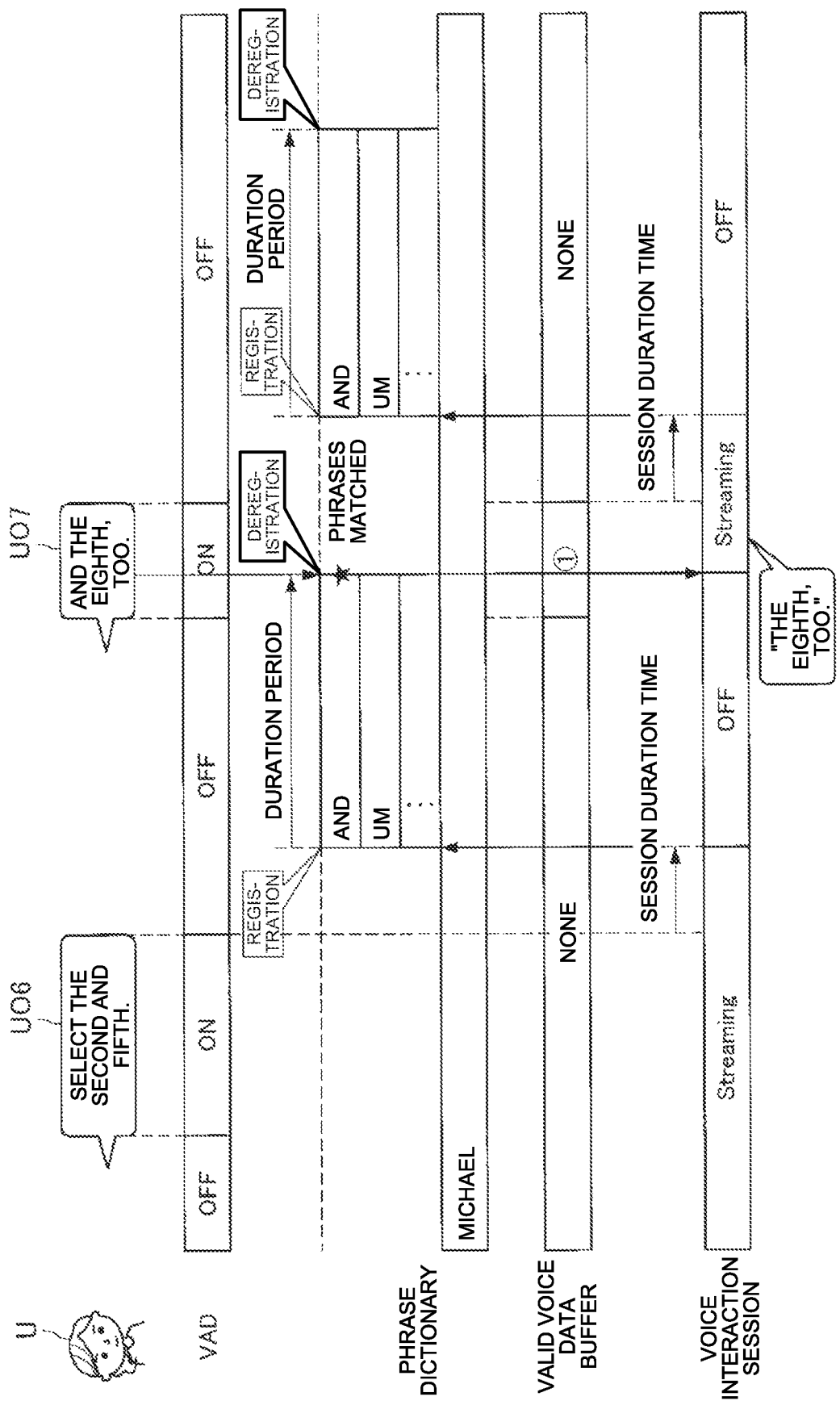
FIG. 12 is a diagram for explaining bridge phrases according to the same embodiment.

FIG. 12 is a diagram for explaining bridge phrases according to the present embodiment. In the case of the example illustrated in FIG. 12, the user U makes an utterance UO6 to select the second and fifth of presented items in the state where the voice interaction session is valid.

After the utterance UO6, when a preset predetermined time (for example, several seconds) has elapsed, the session control unit 155 ends the voice interaction session.

At this time, the registration control unit 140 according to the present embodiment temporarily registers the bridge phrase with intent of inheriting the interaction context in the phrase dictionary 125 based on the end of the voice interaction session.

In the case of the example illustrated in FIG. 12, the registration control unit 140 temporarily registers the conjunction "and" and the filler word "um" as bridge phrases in the phrase dictionary 125. As described above, the bridge phrases according to the present embodiment may be phrases such as a conjunction or a filler word that is intended to inherit the interaction context before and after.

According to the dynamic registration control of the bridge phrases according to the present embodiment, for example, as illustrated in FIG. 12, even when the user U makes an utterance UO7 for issuing an instruction to add an item after the end of the voice interaction session, the session control unit 155 can start an voice interaction session based on the recognition of the utterance UO7 including the bridge phrase "and" temporarily registered in the phrase dictionary 125.

At this time, the session control unit 155 according to the present embodiment may transmit the valid voice data corresponding to "The eighth, too" following the bridge phrase "and" to the information processing server 20 by normal input voice streaming.

In addition, at this time, the session control unit 155 according to the present embodiment may instruct the information processing server 20 to interpret the intent of the valid voice data following the bridge phrase through inheritance of the context of the previous voice interaction session. In the case of the example illustrated in FIG. 12, the session control unit 155 notifies the information processing server 20 that the words "The eighth, too" in the utterance UO7 inherits the context of "Select the second and fifth" in the utterance UO6, so that the information processing server 20 can interpret that the user U wishes to select the second, fifth, and eighth.

When the voice interaction session is started based on the recognition of the temporarily added bridge phrase, the registration control unit 140 deregisters the bridge phrase from the phrase dictionary 125. The registration control unit 140 may also deregister the temporarily added bridge phrase upon lapse of the preset duration period.

In the case of the example illustrated in FIG. 12, the registration control unit 140 deletes the bridge phrase from the phrase dictionary 125 based on the recognition of the utterance U07 and the start of the voice interaction session. Further, the registration control unit 140 registers the bridge phrase again in the phrase dictionary 125 based on the end of the voice interaction session having started based on the recognition of the utterance UO7, and then deregisters the registered bridge phrase based on the lapse of the duration period.

Next, other usage examples of bridge phrases according to the present embodiment will be described. In the following description, the part enclosed in ( ) is a user's utterance that is the source from which a context is inherited, and the part enclosed in < > is a bridge phrase.

To add a search condition to the search conditions specified in the utterance that is the source of inheritance
"(Search by XX and YY.) . . . <And by ZZ.>"
To issue an instruction for normal replay of video contents by the utterance that is the source of inheritance and later issue an instruction to change to digest replay
"(Replay the second normally.) . . . <After all, replay the digest.>"
To set the volume related to music replay by the utterance that is the source of inheritance and, after listening for a while, issue an instruction to mute the game sound
"(Set the music volume to 20.) . . . <Ah, um, mute the game sound.>"

Figure 13:
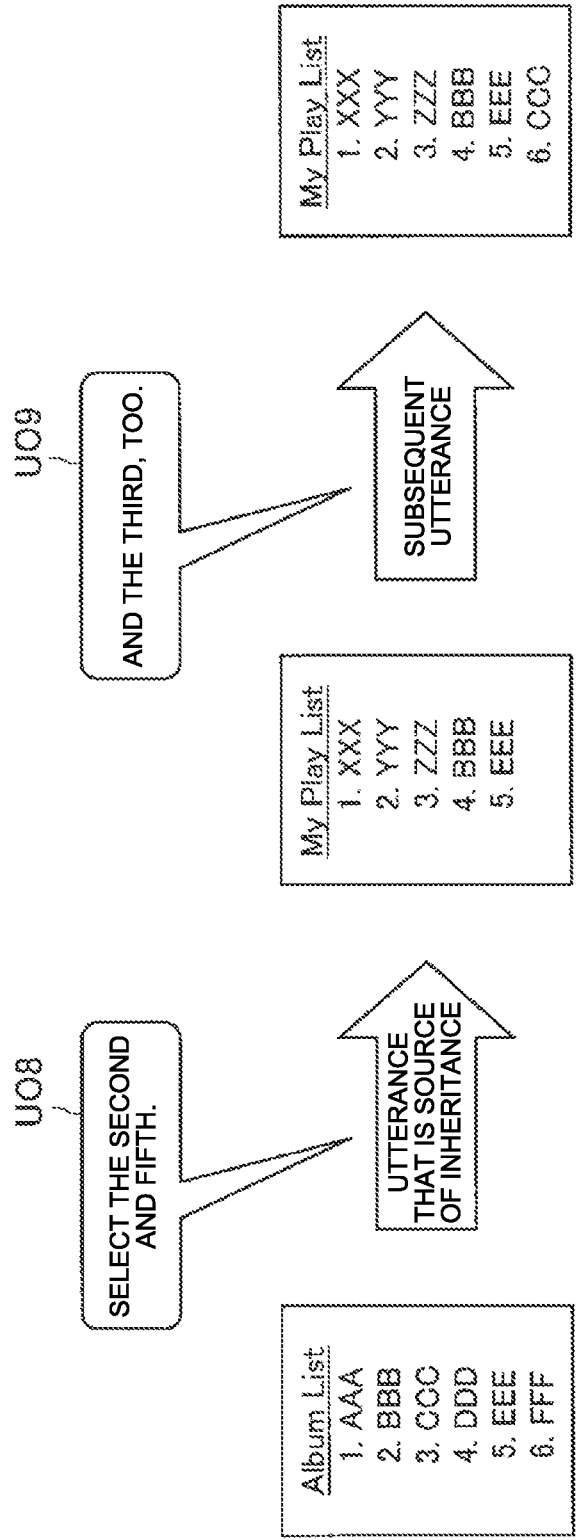
FIG. 13 is a diagram illustrating an example of function execution control based on bridge phrases according to the same embodiment.

FIG. 13 is a diagram illustrating an example of function execution control based on bridge phrases according to the present embodiment. FIG. 13 illustrates an example of a case where a user adds an arbitrary music piece from a presented music list to a playlist in a music replay/management application.

In the case of the example illustrated in FIG. 13, first, a music list in an album as illustrated on the left side of the diagram is displayed on a display unit included in the information processing terminal 10 or a separate display device. When the user makes an utterance UO8 for issuing an instruction to add the second and fifth from the displayed music list to the playlist, the information processing server 20 executes the automatic voice recognition process and the natural language understanding process based on the valid voice data transmitted from the information processing terminal 10, adds the music piece "BBB" and the music piece "EEE" to the playlist as illustrated in the center of the drawing, and displays the playlist on the display unit.

When a subsequent utterance UO9 is recognized by the control of a normal startup word, that is, when the information processing server 20 is not notified that the utterance UO9 inherits the context of the utterance UO8, the information processing server 20 interprets the intent of the utterance UO9 as the replay of the third music piece in the playlist, and instructs the information processing terminal 10 to replay the third music piece.

On the other hand, according to the information processing terminal 10 of the present embodiment, it is possible to notify the information processing server 20 that the utterance UO9 inherits the context of the utterance UO8 by recognizing the bridge phrase. According to this, as illustrated in the right side of the drawing, the information processing server 20 can correctly interpret that the utterance UO9 is intended to add the third music piece in the music list in the album, and execute the process.

Figure 14:
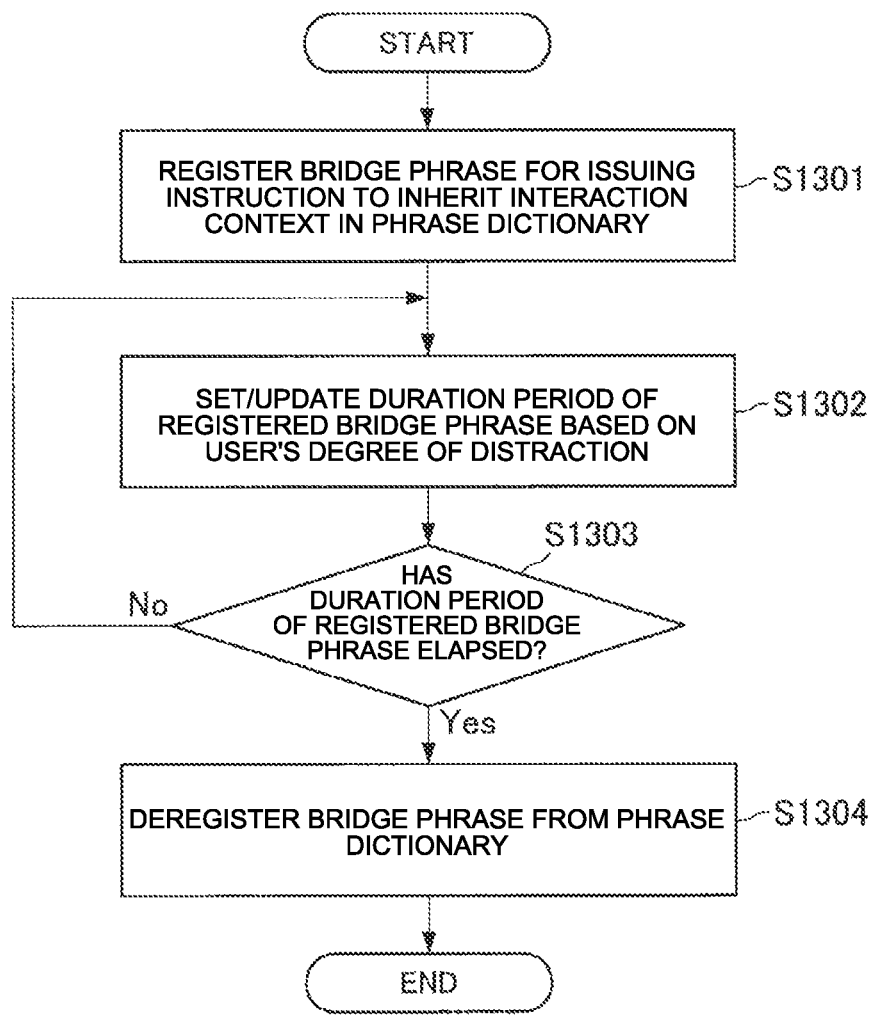
FIG. 14 is a flowchart illustrating a flow of registration control of a bridge phrase according to the same embodiment.

Next, a flow of registration control of a bridge phrase according to the present embodiment will be described. FIG. 14 is a flowchart illustrating a flow of registration control of a bridge phrase according to the present embodiment. FIG. 14 illustrates a control flow from the timing when the voice interaction session is completed.

Referring to FIG. 14, when the voice interaction session is completed, the registration control unit 140 temporarily additionally registers the bridge phrase for issuing an instruction to inherit the context of the interaction in the phrase dictionary 125 (S1301).

Next, the registration control unit 140, based on the "degree of distraction" indicating how much the user commits themselves to events other than the voice interaction session, sets and updates the duration period of the registered bridge phrase (S1302). The "degree of distraction" according to the present embodiment will be separately described in detail.

Next, the registration control unit 140 determines whether the duration period set in step S1302 has elapsed (S1303).

When the duration period has elapsed (S1303: Yes), the registration control unit 140 deletes the temporarily added bridge phrase from the phrase dictionary 125 (S1304).

When any utterance including a bridge phrase registered in the phrase dictionary 125 is recognized in the above steps S1301 to S1304, the registration control unit 140 stops the above flow, and the session control unit 155 starts session control based on startup phrase recognition described later.

Next, the dynamic setting of the duration period according to the present embodiment will be described in detail. As described above, as one of its features, the registration control unit 140 according to the present embodiment sets the duration period for temporary registration of a startup phrase, and after setting of the duration period, deregisters the startup phrase from the phrase dictionary 125.

First, the setting of the duration periods of a post-questioning phrase and a bridge phrase will be described. The registration control unit 140 according to the present embodiment may determine the duration periods relating to a post-questioning phrase and a bridge phrase, for example, based on the "degree of distraction" indicating how much the user commits themselves to events other than the voice interaction session.

For example, when the user performs voice interaction with the information processing terminal 10 "while" playing a game or performs voice interaction with the information processing terminal 10 "while" watching a television device, it is expected that the user will decrease concentration level in the voice interaction session and will be late in making post-questioning or a subsequent utterance inheriting the context of the interaction.

As an example, when the user performs only voice interaction with few controller operations on the home screen of a game machine or the like, the user will pay most of attention to the voice utterance. However, the user is expected to pay more attention to battle scenes in a game involving many control operations, which will lengthen the time intervals between their utterances.

Therefore, when the user is performing another task other than the voice interaction with the information processing terminal 10, the registration control unit 140 according to the present embodiment may set the duration period to be longer as the degree of concentration of the user on the other task, that is, the "degree of distraction" is higher.

For example, when the user is performing no task other than the voice interaction with the information processing terminal 10, the registration control unit 140 may set the duration period to a predetermined period (for example, five seconds).

On the other hand, for example, when the user is performing voice interaction with the information processing terminal 10 while playing a game, the registration control unit 140 may set the duration periods of a post-questioning phrase and a bridge phrase to be longer than the predetermined time as the frequency of controller operations is higher.

For example, when the television device is playing a program, the registration control unit 140 may set the duration period to be slightly longer than the predetermined period, and when the user directs their eyes toward the television device, the registration control unit 140 may further extend the duration period.

In addition, for example, when the user is performing voice interaction with the information processing terminal 10 while doing housework, the registration control unit 140 may set the duration period to be longer as the motion of the user recognized by the sensor recognition unit 135 from the image or the sensor information is larger.

As illustrated in FIGS. 5 and 14, the registration control unit 140 may dynamically update the duration period based on the degree of distraction until the lapse of the duration period.

Next, the setting of the duration period related to the related function phrases according to the present embodiment will be described. To register a related function phrase related to a function that is strongly related to another function executed by the user based on the function template 145 or the operation log 150, the registration control unit 140 may set the duration period to a period of time until the executed function is completed, that is, a period of time during which the function under execution is enabled.

For example, when music replay is performed by the user, the registration control unit 140 may set the duration period of related function phrases such as "sound volume", "next", and "previous" as the period of time until the music replay is completed.

In addition, for example, when the user starts the timer, the registration control unit 140 may set the duration period of the related function phrase such as "stop" as the period of time from when the timer times out and the alarm starts to ring until when the alarm automatically stops.

Further, to register a related function phrase based on the operation log 150, the registration control unit 140 may set the period of the maximum value+a between the operation utterances stored in the operation log 150 as the duration period.

For example, when the maximum value of time between the operation utterance "Set the alarm for seven a.m." and the operation utterance "Turn off the light." made by the user in the past stored in the operation log 150 is nine seconds, the registration control unit 140 may set a to four seconds and set the duration time of the related function phrase "the light" to nine seconds+four seconds=13 seconds.

As described above, according to the registration control unit 140 of the present embodiment, it is possible to appropriately set the duration period in accordance with the type of the startup phrase, thereby to reduce the load of inputting a preset static startup word and realize natural voice interaction, and prevent welling.

Figure 15A:
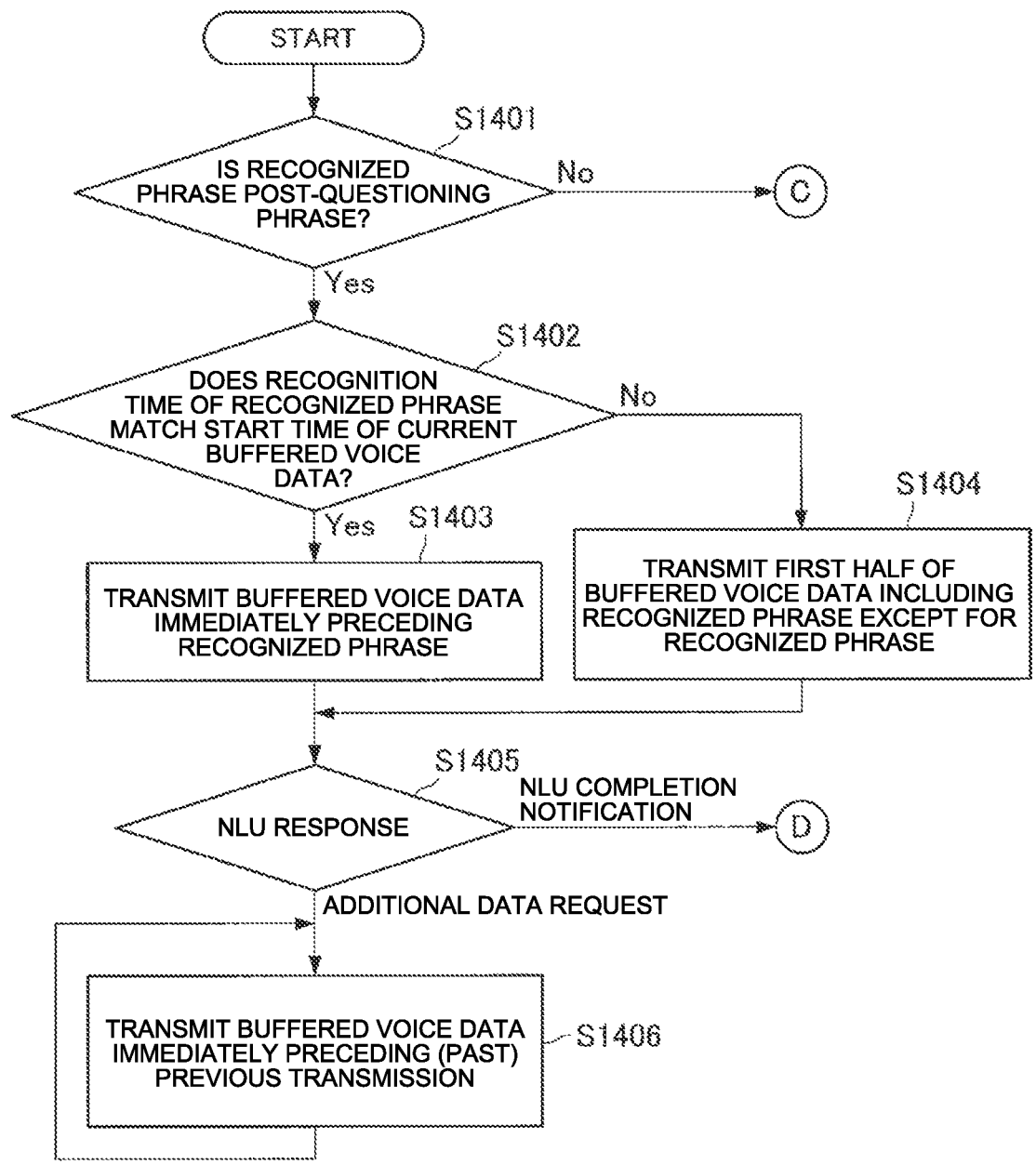
FIG. 15A is a flowchart illustrating a flow of session control based on startup phrase recognition according to the same embodiment.
Figure 15B:
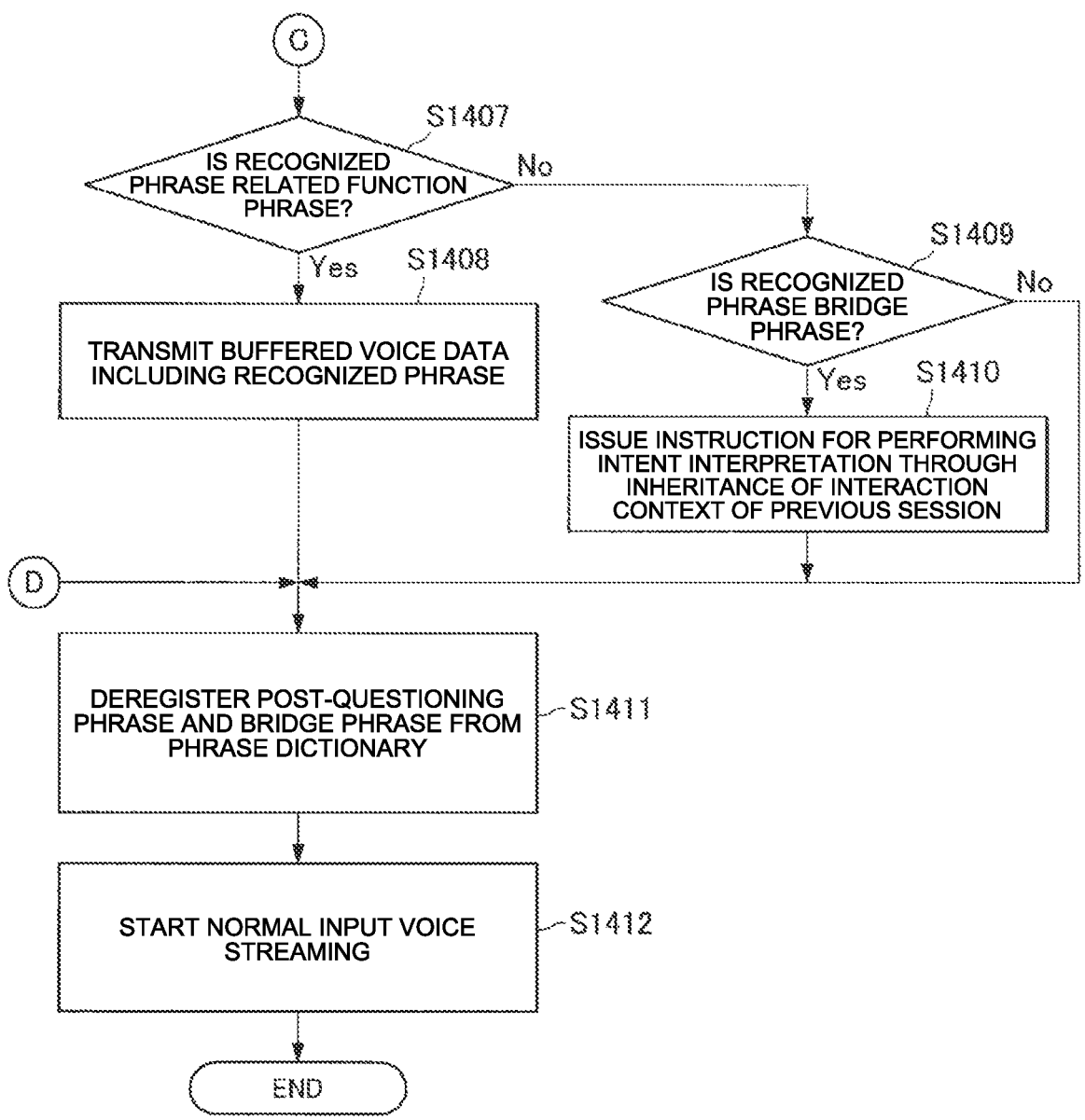
FIG. 15B is a flowchart illustrating the flow of session control based on startup phrase recognition according to the same embodiment.

Next, a flow of session control based on startup phrase recognition according to the present embodiment will be described in detail. FIGS. 15A and 15B are flowcharts illustrating the flow of session control based on startup phrase recognition according to the present embodiment. FIGS. 13A and 14B show the flow of a process for starting a voice interaction session by the session control unit 155 according to the present embodiment based on the recognition of an utterance including a startup phrase temporarily registered in the phrase dictionary 125. In addition, "C" and "D" in FIGS. 15A and 15B are symbols added to indicate the connection between the flowcharts.

When the phrase voice recognition unit 120 recognizes an utterance including a startup phrase, the session control unit 155 first determines whether the recognized startup phrase (recognized phrase) is a post-questioning phrase (S1401).

When the recognized phrase is a post-questioning phrase (S1402), the session control unit 155 determines whether the recognition time of the recognized phrase matches the start time of the valid voice data (buffered voice data) currently buffered (S1402).

When the recognition time of the recognized phrase and the start time of the buffered voice data match (S1402: Yes), the session control unit 155 transmits the buffered voice data immediately preceding the recognized phrase to the information processing server 20 (1403).

On the other hand, when the recognition time of the recognized phrase and the start time of the buffered voice data do not match (S1402: No), the session control unit 155 transmits the first half of the buffered voice data including the recognized phrase excluding the recognized phrase to the information processing server 20 (1404).

After execution of step S1403 or S1404, the session control unit 155 receives a response related to natural language understanding (NLU) from the information processing server 20, and determines the contents of the response (S1405).

When the response received in step S1405 is a request for additional data (S1405: additional data request), the session control unit 155 transmits the buffered voice data immediately preceding (past) the previously transmitted buffered voice data, to the information processing server 20 (S1406), and returns to step S1405.

On the other hand, when the response received in step S1405 is an NLU completion notification (S1405: NLU completion notification), the session control unit 155 proceeds to step S1411 described later.

When determining in step S1401 that the recognized phrase is not a post-questioning phrase (S1401: No), then the session control unit 155 determines whether the recognized phrase is a related function phrase (S1407).

When determining that the recognized phrase is a related function phrase (S1407: Yes), the session control unit 155 transmits buffered voice data including the recognized phrase to the information processing server 20 (S1408).

On the other hand, when not determining that the recognized phrase is not a related function phrase (S1407: No), then the session control unit 155 determines whether the recognized phrase is a bridge phrase (S1409).

When determining that the recognized phrase is a bridge phrase (S1409: Yes), the session control unit 155 instructs the information processing server 20 to perform intent interpretation through inheritance of the interaction context of the previous voice interaction session (S1410).

When the response received in step S1405 is an NLU completion notification (S1405: NLU completion notification), or when the step S1408 or S1410 is completed, or when, in step S1409, the session control unit 155 determined that the recognized phrase is not a bridge phrase (i.e., the recognized phrase is a startup word that has been statically set in advance) (S1409: No), the registration control unit 140 deregisters the temporarily added post-questioning phrase and bridge phrase from the phrase dictionary 125 (S1411).

Next, the session control unit 155 starts normal input voice streaming (S1412).

«1.6. Advantageous Effects»

The control of dynamic registration of a startup phrase and the control of a voice interaction session according to the present embodiment have been described above in detail. As described above, according to the information processing terminal 10 of the present embodiment, it is possible to reduce the burden of uttering a startup word statically determined in advance each time a voice interaction session is started. Further, according to the information processing system of the present embodiment, it is possible to start a voice interaction session by recognizing a natural utterance made by a person in the context of situation or interaction, thereby achieving system operation with a natural utterance with no consciousness of a static startup word.

For example, according to the information processing terminal 10 of the present embodiment, when operations related to a plurality of functions are to be performed continuously by utterances, there is no necessary to utter a static startup word each time each function is executed. This makes it possible to effectively reduce the input load related to the startup word.

According to the information processing terminal 10 of the present embodiment, the user is not required to issue an instruction or a request by a single utterance, which makes it possible to reduce the input load and the psychological burden on the user.

According to the information processing terminal 10 of the present embodiment, when operating the information processing system by voice interaction while performing another task, the user can perform operations without a static startup word even if there is a certain of time between utterances.

According to the information processing terminal 10 of the present embodiment, the user is allowed to, after making a request, issue an execution instruction or request related to the request ex post facto, which makes it possible to broaden the range of operations.

Furthermore, according to the information processing terminal 10 of the present embodiment, temporarily registering only the startup phrases corresponding to various contexts with appropriate duration times makes it possible to prevent the flow of voice data not intended by the user to an external device such as the information processing server 20 via the network 30. According to this feature, it can be expected that the security will be ensured and the network communication load of the entire information processing system will be reduced.

According to the information processing terminal 10 of the present embodiment, it is possible to set the duration time of the voice interaction session to be short in case the voice interaction with the user is interrupted, thereby preventing a malfunction due to welling.

Further, according to the information processing terminal 10 of the present embodiment, it is possible to prevent a situation where the continuation of the voice interaction session causes the user to feel that they must make an utterance so that communication such as conversation between users is disturbed.

Further, the functions of the information processing terminal 10 according to the present embodiment are also effective for the user to perform an operation and achieve the purpose taking time while receiving feedback from the system, such as search or selection from a plurality of options.

The functions of the information processing terminal 10 and the information processing server 20 according to the present embodiment have been described above in detail. The information processing terminal 10 and the information processing server 20 according to the present embodiment can perform various controls that enhance user convenience, in addition to the controls described above.

For example, the information processing terminal 10 according to the present embodiment may accept a user's posterior instruction or request by pressing a button, in addition to the post-questioning phrases. At this time, the information processing terminal 10 may indicate to the user that the valid voice data is buffered, for example, by lighting a button when VAD is turned on.

Further, when starting a voice interaction session based on the recognition of a startup phrase, the information processing terminal 10 may show the user the reason for the start of the voice interaction session and the recognized startup phrase.

The information processing terminal 10 according to the present embodiment may perform registration control of a personalized startup phrase according to the characteristics of the user. The information processing terminal 10 may employ, for example, a conjunction or filler word that the user tends to frequently utter as a bridge phrase.

When the user utters statically set startup words all the time, the information processing terminal 10 may present information relating to the dynamic control of the startup phrases, and when the user utters a startup word in a situation where the utterance of the startup word is not required, the information processing terminal 10 may provide feedback.

2. Hardware Configuration Example

Figure 16:
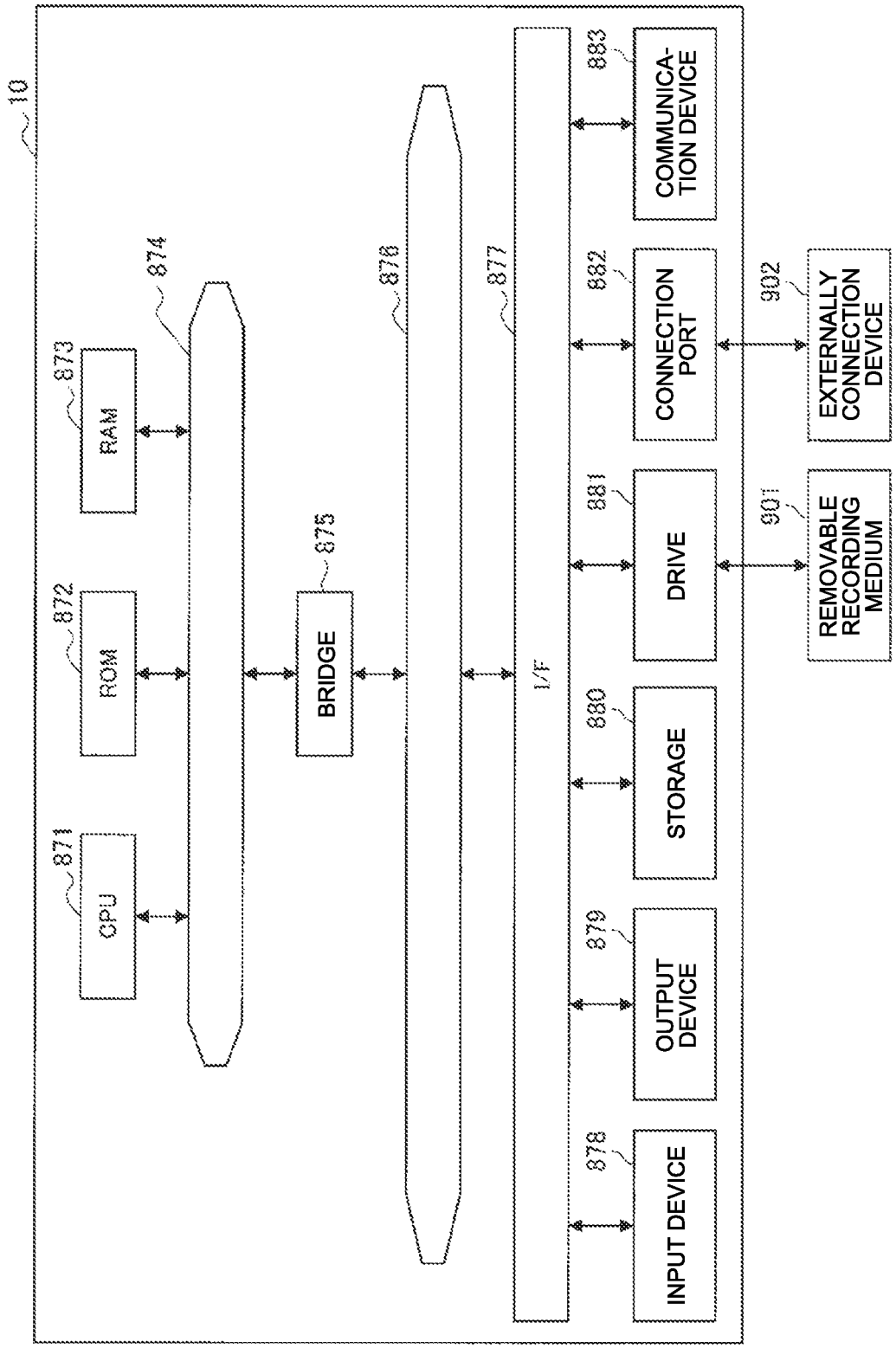
FIG. 16 is a diagram illustrating a hardware configuration example according to an embodiment of the present disclosure.

Next, a hardware configuration example of the information processing terminal 10 according to an embodiment of the present disclosure will be described. FIG. 16 is a block diagram illustrating an example of a hardware configuration of the information processing terminal 10 according to an embodiment of the present disclosure. With reference to FIG. 16, the information processing terminal 10 includes, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. In addition, components other than the components illustrated herein may be further included.

(CPU871)

The CPU 871 functions as, for example, an arithmetic processing device or a control device, and controls overall operations of the respective components or some thereof based on various programs recorded in the ROM 872, the RAM 873, the storage 880, or a removable recording medium 901.

(ROM 872 and RAM 873)

The ROM 872 is a means for storing a program to be read by the CPU 871, data to be used for calculation, and the like. The RAM 873 temporarily or permanently stores, for example, the program to be read by the CPU 871, various parameters that change as appropriate when the program is executed, and the like.

(Host bus 874, bridge 875, external bus 876, and interface 877)

The CPU 871, the ROM 872, and the RAM 873 are connected to each other via, for example, the host bus 874 capable of high-speed data transmission. Meanwhile, the host bus 874 is connected to the external bus 876, which has a relatively low data transmission speed, via the bridge 875, for example. In addition, the external bus 876 is connected to various components via the interface 877.

(Input Device 878)

As the input device 878, for example, a mouse, a keyboard, a touch panel, a button, a switch, a lever, or the like is used. Further, a remote controller (hereinafter, remote controller) capable of transmitting a control signal using infrared rays or other radio waves may be also used as the input device 878. In addition, the input device 878 also includes a voice input device such as a microphone.

(Output Device 879)

The output device 879 is a device capable of visually or audibly notifying acquired information to a user, for example, a display device such as Cathode Ray Tube (CRT), LCD, and organic EL, an audio output device such as a speaker and a headphone, a printer, a mobile phone, a facsimile, or the like. In addition, the output device 879 according to the present disclosure includes various vibration devices capable of outputting haptic stimulation.

(Storage 880)

The storage 880 is a device configured to store various types of data. As the storage 880, for example, a magnetic storage device such as a hard disk drive (HDD), a semiconductor storage device, an optical storage device, a magneto-optical storage device, or the like is used.

(Drive 881)

The drive 881 is a device that reads information recorded on the removable recording medium 901 such as a magnetic disk, an optical disk, a magneto-optical disk, and a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. It is a matter of course that the removable recording medium 901 may be, for example, an IC card equipped with a non-contact IC chip, an electronic device, or the like.

(Connection port 882)

The connection port 882 is a port configured to connect an external connection device 902, for example, a universal serial bus (USB) port, an IEEE 1394 port, a small computer system interface (SCSI), an RS-232C port, an optical audio terminal, or the like.

(External Connection Device 902)

The external connection device 902 is, for example, a printer, a portable music player, a digital camera, a digital video camera, an IC recorder, or the like.

(Communication Device 883)

The communication device 883 is a communication device configured for connection to a network and is, for example, a wired or wireless LAN, a communication card for Bluetooth (registered trademark) or a wireless USB (WUSB), a router for optical communication, a router for an asymmetric digital subscriber line (ADSL), or a modem for various communications.

<3. Conclusion>

As described above, the information processing terminal 10 that implements an information processing method according to the embodiment of the present disclosure includes the registration control unit 140 that dynamically controls registration of a startup phrase to be used as a start trigger for a voice interaction session. In addition, the registration control unit 140 according to the embodiment of the present disclosure is characterized by temporarily additionally registering at least one startup phrase based on the input voice. According to such a configuration, it is possible to effectively reduce the input load related to a voice trigger.

As described above, the favorable embodiments of the present disclosure have been described in detail with reference to the accompanying drawings, but the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

In addition, the effects described in the present specification are merely illustrative or exemplary, and are not limited to those described in the present specification. That is, the technology according to the present disclosure can exhibit other effects apparent to those skilled in the art from the description of the present specification, in addition to or instead of the effects described above.

It is also possible to create programs for causing hardware such as CPU, ROM, and RAM incorporated in a computer to exhibit the same functions as the components of the information processing terminal 10, and it is also possible to provide a computer-readable recording medium that records the programs.

In addition, the respective steps relating to the processing of the information processing terminal 10 in the present specification are not necessarily processed in a time-series manner in the order described in the flowchart. For example, the steps relating to the processing of the information processing terminal 10 may be processed in an order different from the order described in the flowchart, or may be processed in parallel.

Note that the following configuration also belong to the technical scope of the present disclosure.

(1)

An information processing device comprising a registration control unit that dynamically controls registration of startup phrases used as start triggers of a voice interaction session, wherein the registration control unit temporarily additionally registers at least one of the startup phrases based on input voice.

(2)

The information processing device according to (1), wherein the registration control unit deregisters the startup phrase that has been temporarily added after lapse of a duration period.

(3)

The information processing device according to (2), further comprising a session control unit that controls start and end of the voice interaction session, wherein the session control unit starts the voice interaction session based on recognition of an utterance including the startup phrase that has been temporarily additionally registered.

(4)

The information processing device according to (3), wherein the startup phrases include at least one of post-questioning phrases, related function phrases, and bridge phrases.

(5)

The information processing device according to (4), wherein the startup phrases include the post-questioning phrases with intention to pose a post-question to an agent function, and the registration control unit temporarily additionally registers at least one of the post-questioning phrases after a predetermined time since detection of a voice section.

(6)

The information processing device according to (5), wherein the session control unit starts the voice interaction session based on recognition of an utterance including the post-questioning phrase that has been temporarily additionally registered, and transmits valid voice data buffered before the recognition of the post-questioning phrase to an external device.

(7)

The information processing device according to (6), wherein, upon receipt of a request for additional data from the external device after the transmission of the valid voice data, the session control unit transmits the other valid voice data buffered immediately preceding the transmitted valid voice data to the external device.

(8)
The information processing device according to any one of (4) to (7), wherein the startup phrases include the bridge phrases with intent of inheriting an interaction context, and the registration control unit temporarily additionally registers at least one of the bridge phrases based on end of the voice interaction session.

(9)
The information processing device according to (8), wherein the session control unit starts the voice interaction session based on the recognition of an utterance including the bridge phrase that has been temporarily additionally registered.

(10)
The information processing device according to (9), wherein the session control unit starts a voice interaction session by input voice streaming after the recognition of the bridge phrase.

(11)
The information processing device according to any one of (8) to (10), wherein the bridge phrase includes at least one of a conjunction and a filler word.

(12)
The information processing device according to any one of (4) to (11), wherein the startup phrases include the related function phrases with intent of issuing an instruction for execution of another function that is highly related to a function executed by the user, and the registration control unit temporarily additionally registers at least one of the related function phrases based on execution of the function by an utterance of the user.

(13)
The information processing device according to (12), wherein the registration control unit additionally registers the related function phrase based on a function template defined based on strength of relationship between the functions and an operation log related to an operation by the user.

(14)
The information processing device according to (12) or (13), wherein the session control unit starts the voice interaction session based on the recognition of an utterance including the related function phrase that has been temporarily additionally registered, and transmits valid voice data including the buffered related function phrase to an external device.

(15)
The information processing device according to any one of (5) to (11), wherein the registration control unit determines the duration period based on the degree of distraction indicating how much the user commits themselves to events other than the voice interaction session.

(16)
The information processing device according to any one of (5) to (11), wherein the registration control unit deregisters the temporarily added startup phrase based on start of the voice interaction session by the recognition of the temporarily added startup phrase.

(17)
The information processing device according to any one of (12) to (14), wherein the registration control unit sets a period of time from execution of the function by the user to the completion of the execution of the function as the duration period.

(18)
An information processing device comprising a session control unit that controls start and end of a voice interaction session, wherein the session control unit starts the voice interaction session based on recognition of an utterance including a post-questioning phrase with intent of posing a post-question to an agent function, and transmits valid voice data buffered before the recognition of the post-questioning phrase to an external device.

(19)
An information processing method comprising dynamically controlling, by a processor, registration of startup phrases used as start triggers of a voice interaction session, wherein the controlling further includes temporarily additionally registering at least one of the startup phrases based on input voice.

(20)
An information processing method comprising controlling, by a processor, start and end of a voice interaction session, wherein the controlling further includes: starting the voice interaction session based on recognition of an utterance including a post-questioning phrase with intent of posing a post-question to an agent function; and transmitting valid voice data buffered before the recognition of the post-questioning phrase to an external device.

REFERENCE SIGNS LIST

10 INFORMATION PROCESSING TERMINAL
115 VOICE ACTIVITY DETECTION UNIT
120 PHRASE VOICE RECOGNITION UNIT
125 PHRASE DICTIONARY
140 REGISTRATION CONTROL UNIT
145 FUNCTION TEMPLATE
150 OPERATION LOG
155 SESSION CONTROL UNIT
20 INFORMATION PROCESSING SERVER
210 AUTOMATIC VOICE RECOGNITION UNIT
220 NATURAL LANGUAGE UNDERSTANDING UNIT
230 RESPONSE CONTROL UNIT

The invention claimed is:
1. An information processing device, comprising:
a processor configured to:
  detect a section in which a first input voice is uttered by a user, from sounds collected by a microphone, based on a voice activity detection by a decoder;
  buffer first valid voice data corresponding to the first input voice uttered by the user;
  dynamically control registration of startup phrases, included in the first input voice uttered by the user, wherein the startup phrases trigger a first voice interaction session;
  temporarily additionally register at least one startup phrase of the startup phrases, to a phrase dictionary, based on the first valid voice data buffered corresponding to the first input voice;
  start the first voice interaction session based on recognition of the first input voice uttered, wherein the first input voice uttered includes the at least one startup phrase of the startup phrases, wherein the startup phrases comprise at least one bridge phrase of bridge phrases, and wherein the at least one bridge phrase of the bridge phrases is included with an intent to inherit an interaction context;

transmit a part of the first valid voice data to an external device based on the recognition of the first input voice uttered related to natural language understanding (NLU);

control an end of the first voice interaction session based on a lapse of a preset time, wherein the at least one bridge phrase of the bridge phrases is temporarily registered to the phrase dictionary based on the end of the first voice interaction session;

start a second voice interaction session based on recognition of a second input voice uttered by the user and deleting the at least one bridge phrase that has been temporarily registered, wherein the second input voice includes the at least one bridge phrase of the bridge phrases;

control an end of the second voice interaction session, wherein the at least one bridge phrase is registered to the phrase dictionary based on the end of the second voice interaction session; and deregister the at least one of the bridge phrase of the bridge phrases, from the phrase dictionary, after a lapse of a determined period.

2. The information processing device according to claim 1, wherein
the processor is further configured to control start of the first voice interaction session and the second voice interaction session.

3. The information processing device according to claim 2, wherein
the startup phrases further include at least one post-questioning phrase of post-questioning phrases and related function phrases.

4. The information processing device according to claim 3, wherein
the startup phrases include the at least one post-questioning phrase of the post-questioning phrases with an intention to pose a post-question to an agent function, and
the processor is further configured to temporarily additionally register the at least one post-questioning phrase of the post-questioning phrases after a determined time since the detection of the section.

5. The information processing device according to claim 4, wherein
the processor is further configured to:
start the first voice interaction session based on the recognition of the first input voice uttered including the at least one post-questioning phrase of the post-questioning phrases that has been temporarily additionally registered; and
transmit the first valid voice data buffered before the recognition of the at least one post-questioning phrase of the post-questioning phrases to the external device.

6. The information processing device according to claim 5, wherein
upon receipt of a request for additional data from the external device after the transmission of the first valid voice data, the processor is further configured to transmit second valid voice data buffered immediately preceding the transmitted first valid voice data to the external device.

7. The information processing device according to claim 1, wherein
the processor is further configured to start the second voice interaction session by input voice stream after the recognition of the at least one bridge phrase of the bridge phrases.

8. The information processing device according to claim 1, wherein the at least one bridge phrase of the bridge phrases includes at least one of a conjunction and a filler word.

9. The information processing device according to claim 3, wherein
the startup phrases include the related function phrases with an intent of issuing an instruction for execution of a first function that is highly related to a second function executed by the user, and
the processor is further configured to temporarily additionally register at least one related function phrase of the related function phrases based on execution of the second function by the first input voice uttered by the user.

10. The information processing device according to claim 9, wherein
the processor is further configured to additionally register at least one related function phrase of the related function phrases based on a function template, wherein the function template is defined based on a strength of relationship between the first function and the second function and an operation log related to an operation by the user.

11. The information processing device according to claim 9, wherein
the processor is further configured to start the second voice interaction session based on the recognition of the second input voice uttered, wherein the second input voice includes the at least one related function phrase of the related function phrases that has been temporarily additionally registered, and transmit second valid voice data including the related function phrases to the external device.

12. The information processing device according to claim 4, wherein
the processor is further configured to determine the determined period based on a degree of distraction, and wherein the degree of distraction indicates how much the user commits to events other than the first voice interaction session and the second voice interaction session.

13. The information processing device according to claim 4, wherein
the processor is further configured to deregister the temporarily additionally registered the at least one startup phrase of the startup phrases based on start of the first voice interaction session by the recognition of the temporarily additionally registered the at least one startup phrase of the startup phrases.

14. The information processing device according to claim 9, wherein
the processor is further configured to set a period of time from execution of the second function by the user to completion of the execution of the second function as the determined period.

15. An information processing device, comprising:
a processor configured to:
detect a section in which a first input voice is uttered, from sounds collected by a microphone, based on a voice activity detection by a decoder;

buffer valid voice data corresponding to the first input voice uttered by a user;

control start of a first voice interaction session based on recognition of the first input voice uttered, wherein the first input voice uttered includes a bridge phrase that has been temporarily additionally registered, to a phrase dictionary, with an intent to inherit an interaction context;

transmit a part of the valid voice data is transmitted to an external device based on the recognition of the first input voice uttered related to natural language understanding (NLU);

control an end of the first voice interaction session based on a lapse of a preset time, wherein the bridge phrase is temporarily registered to the phrase dictionary based on the end of the first voice interaction session;

start a second voice interaction session based on recognition of a second input voice uttered by the user and deleting the bridge phrase that has been temporarily registered, wherein the second input voice includes the bridge phrase;

control an end of the second voice interaction session, wherein the bridge phrase is registered to the phrase dictionary based on the end of the second voice interaction session; and deregister the bridge phrase, from the phrase dictionary, after a lapse of a determined period.

16. An information processing method, comprising:

detecting, by a processor, a section in which a first input voice is uttered, from sounds collected by a microphone, based on a voice activity detection by a decoder;

buffering, by the processor, valid voice data corresponding to the first input voice uttered by a user;

dynamically controlling, by the processor, registration of startup phrases, included in the first input voice uttered by the user, wherein the startup phrases trigger a first voice interaction session;

temporarily additionally registering at least one startup phrase of the startup phrases, to a phrase dictionary, based on the valid voice data buffered corresponding to the first input voice;

starting, by the processor, the first voice interaction session based on recognition of the first input voice uttered, wherein the first input voice uttered includes the at least one startup phrase of the startup phrases wherein the startup phrases comprise at least one bridge phrase of bridge phrases, and wherein the at least one bridge phrase of the bridge phrases is included with an intent of inheriting an interaction context;

transmitting, by the processor, a part of the valid voice data to an external device based on the recognition of the first input voice uttered related to natural language understanding (NLU);

controlling, by the processor, an end of the first voice interaction session based on a lapse of a preset time, wherein the at least one bridge phrase of the bridge phrases is temporarily registered to the phrase dictionary based on the end of the first voice interaction session;

starting, by the processor, a second voice interaction session based on recognition of a second input voice uttered by the user and deleting the at least one bridge phrase that has been temporarily registered, wherein the second input voice includes the at least one bridge phrase of the bridge phrases;

controlling, by the processor, an end of the second voice interaction session, wherein the at least one bridge phrase is registered to the phrase dictionary based on the end of the second voice interaction session; and deregistering, by the processor, the at least one bridge phrase of the bridge phrases, from the phrase dictionary, after a lapse of a determined period.

17. An information processing method, comprising:

detecting, by a processor, a section in which a first input voice is uttered, from sounds collected by a microphone, based on a voice activity detection by a decoder;

buffering, by the processor, valid voice data corresponding to the first input voice uttered;

controlling, by the processor, start a first voice interaction session based on recognition of the first input voice uttered, wherein the first input voice uttered includes a bridge phrase that has been temporarily additionally registered, to a phrase dictionary, with an intent to inherit an interaction context;

transmitting, by the processor, a part of the valid voice data to an external device based on the recognition of the first input voice uttered related to natural language understanding (NLU);

controlling an end of the first voice interaction session based on a lapse of a preset time, wherein the bridge phrase is temporarily registered to the phrase dictionary based on the end of the first voice interaction session;

starting, by the processor, a second voice interaction session based on recognition of a second input voice uttered and deleting the bridge phrase that has been temporarily registered, wherein the second input voice includes the bridge phrase;

controlling, by the processor, an end of the second voice interaction session, wherein the bridge phrase is registered to the phrase dictionary based on the end of the second voice interaction session; and deregistering, by the processor, the bridge phrase, from the phrase dictionary, after a lapse of a determined period.

* * * * *